US012197167B2

(12) United States Patent
Ogasawara

(10) Patent No.: US 12,197,167 B2
(45) Date of Patent: Jan. 14, 2025

(54) STRUCTURE FOR CONNECTING PLURALITY OF CHASSIS IN IMAGE FORMING APPARATUS

(71) Applicant: CANON KABUSHIKI KAISHA, Tokyo (JP)

(72) Inventor: Akio Ogasawara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/479,171

(22) Filed: Oct. 2, 2023

(65) Prior Publication Data
US 2024/0134309 A1 Apr. 25, 2024
US 2024/0231269 A9 Jul. 11, 2024

(30) Foreign Application Priority Data

Oct. 19, 2022 (JP) .................. 2022-167902

(51) Int. Cl.
G03G 15/00 (2006.01)
G03G 21/16 (2006.01)
H04N 1/00 (2006.01)

(52) U.S. Cl.
CPC ...... *G03G 21/1647* (2013.01); *G03G 21/1619* (2013.01); *H04N 1/00538* (2013.01); *H04N 1/00557* (2013.01); *H04N 1/00562* (2013.01)

(58) Field of Classification Search
CPC ........... G03G 21/1619; G03G 21/1647; H04N 1/00538; H04N 1/00557; H04N 1/00562

USPC ......................................................... 399/107
See application file for complete search history.

(56) References Cited

U.S. PATENT DOCUMENTS

| 10,281,868 | B2 | 5/2019 | Hamaba |
| 11,669,039 | B2* | 6/2023 | Kobayashi ............... H05K 7/18 |
| | | | 399/107 |
| 2009/0092430 | A1 | 4/2009 | Nishikawa et al. |
| 2013/0195503 | A1* | 8/2013 | Nakagaki ............... A47B 91/02 |
| | | | 399/107 |
| 2014/0356021 | A1* | 12/2014 | Sato ................... G03G 21/1619 |
| | | | 399/107 |

FOREIGN PATENT DOCUMENTS

| JP | 2009084035 A | 4/2009 |
| JP | 7024195 B2 | 2/2022 |

* cited by examiner

*Primary Examiner* — Hoang X Ngo
(74) *Attorney, Agent, or Firm* — ROSSI, KIMMS & McDOWELL LLP

(57) ABSTRACT

An image forming apparatus comprises a first chassis, a second chassis, a first connector, a second connector, a first scale and a first indicator. The first chassis and the second chassis are connected via the first connector and the second connector. The first scale is provided on one of the first connector and the second connector. The first scale indicates a relative distance between the first chassis and the second chassis in a first direction. The first indicator is provided on the other of the first connector and the second connector. The first indicator points the first scale.

23 Claims, 14 Drawing Sheets

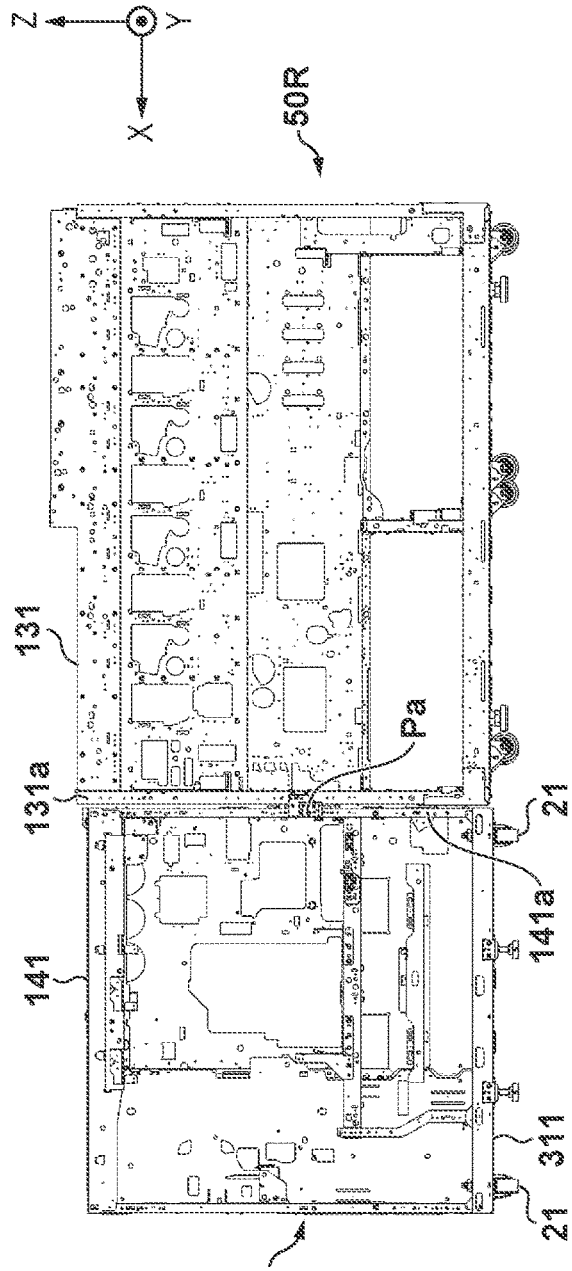
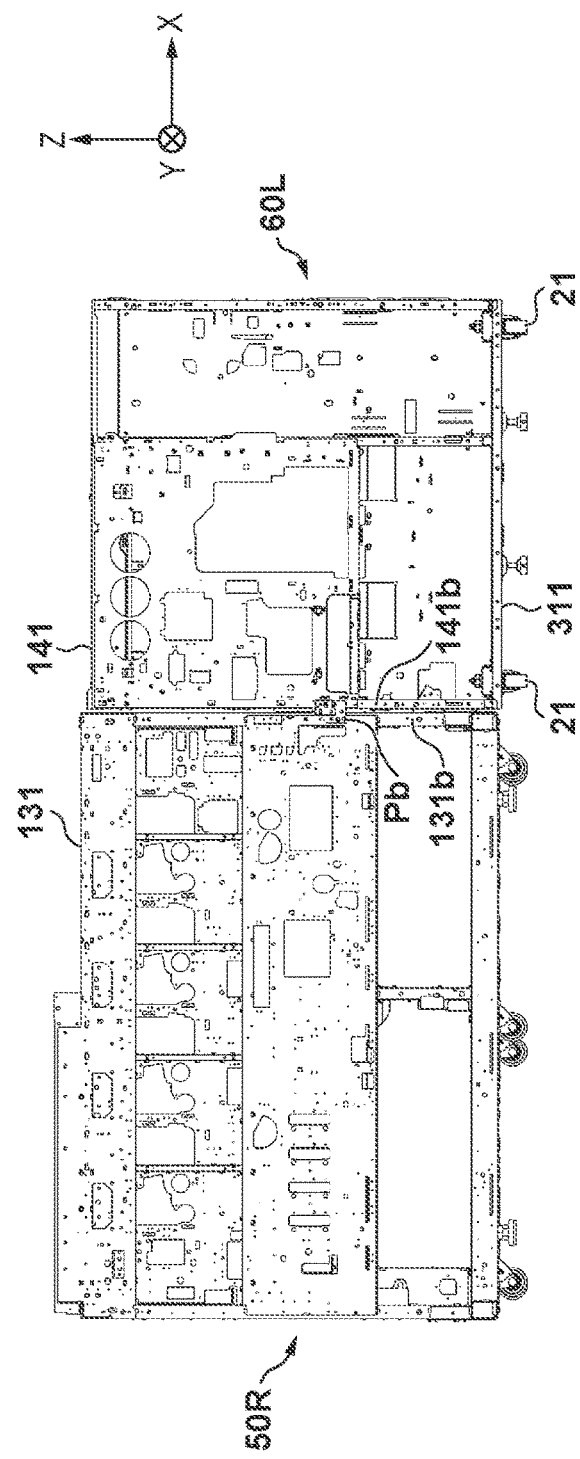
FIG. 5A
FIG. 5B

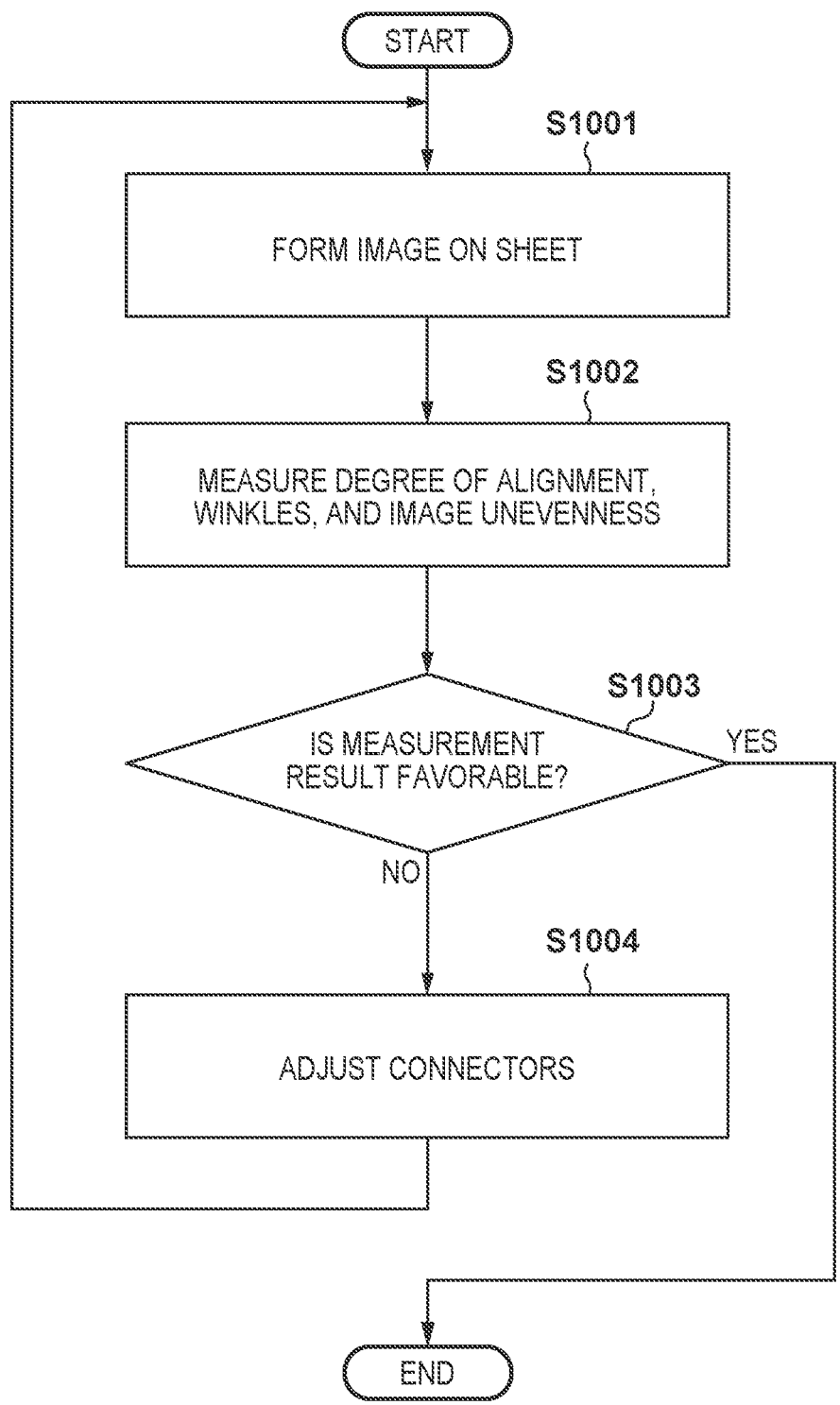

STRUCTURE FOR CONNECTING PLURALITY OF CHASSIS IN IMAGE FORMING APPARATUS

BACKGROUND OF THE INVENTION

Field of the Invention

The present invention relates to a structure for connecting a plurality of chassis in an image forming apparatus.

Description of the Related Art

Image forming apparatuses include small-sized image forming apparatuses intended for general consumers or offices, and large-sized image forming apparatuses intended for offices or commercial printing. In the former apparatuses, all mechanisms that execute an image forming process are housed in one chassis. In the latter apparatuses, a plurality of mechanisms that execute an image forming process are arranged separately in a plurality of chassis (Japanese Patent Laid-Open No. 2009-084035). This is because realizing a large-sized image forming apparatus using one chassis will adversely affect the delivery thereof from a factory to a customer side (e.g., the entry thereof to an elevator). A large-sized image forming apparatus is installed at a customer side by connecting a plurality of chassis at the customer side.

Incidentally, as a plurality of chassis pass sheets to one another, they need to be accurately positioned and connected. However, even if a plurality of neighboring chassis have been accurately positioned, the horizontal angles (angles around the height direction) of a plurality of sheet processing units arranged thereinside may not match the angle that has been assumed design-wise. Japanese Patent No. 7024195 suggests a mechanism for adjusting the angles of two chassis so that the horizontal angle between a plurality of sheet processing units becomes appropriate. Specifically, it suggests a hinge provided on the back surface sides of the two chassis, and a distance adjustment mechanism provided on the front surface sides of the two chassis.

The aforementioned mechanism is based on the precondition that the floor on which the two chassis are installed is level. However, in reality, there are cases where the floor is not level. In such cases, an excess load is applied to the rotation shaft of the hinge, thereby damaging the hinge, or disabling sufficient adjustment of the angles of the two chassis. This makes it difficult for an operator to adjust the angles around the height axis.

SUMMARY OF THE INVENTION

The disclosure provides an image forming apparatus comprising: a first chassis including a first side surface provided with a passage opening through which a sheet passes, a second side surface that neighbors the first side surface, a third side surface that neighbors the first side surface and is located on an opposite side of the second side surface, and a fourth side surface that neighbors the second side surface and the third side surface; a second chassis to be connected to the first chassis and including a fifth side surface provided with a passage opening through which the sheet passes, a sixth side surface that neighbors the fifth side surface, a seventh side surface that neighbors the fifth side surface and is located on an opposite side of the sixth side surface, and an eighth side surface that neighbors the sixth side surface and the seventh side surface; a first connector that is joined to the second side surface of the first chassis and includes a first guiding groove; a second connector that overlaps the first connector and includes a first fitting shaft, the first fitting shaft fitting into a fitting hole provided in the sixth side surface of the second chassis and into the first guiding groove, and the first fitting shaft being guided by the first guiding groove so as to move in a first direction; a third connector that is provided on the third side surface of the first chassis and includes a second guiding groove; a fourth connector that overlaps the third connector and includes a second fitting shaft, the second fitting shaft fitting into a fitting hole provided in the seventh side surface of the second chassis and into the second guiding groove, and the second fitting shaft being guided by the second guiding groove so as to move in the first direction; a first scale provided on one of the first connector and the second connector, the first scale indicating a relative distance between the first chassis and the second chassis in the first direction; and a first indicator provided on the other of the first connector and the second connector, the first indicator pointing the first scale.

Further features of the present invention will become apparent from the following description of exemplary embodiments (with reference to the attached drawings).

BRIEF DESCRIPTION OF THE DRAWINGS

FIGS. 5A and 5B are diagrams for describing a front surface and a back surface of the image forming apparatus.

FIG. 10 is a flowchart showing a method of angle adjustment around a Z axis.

DESCRIPTION OF THE EMBODIMENTS

Figure 1:
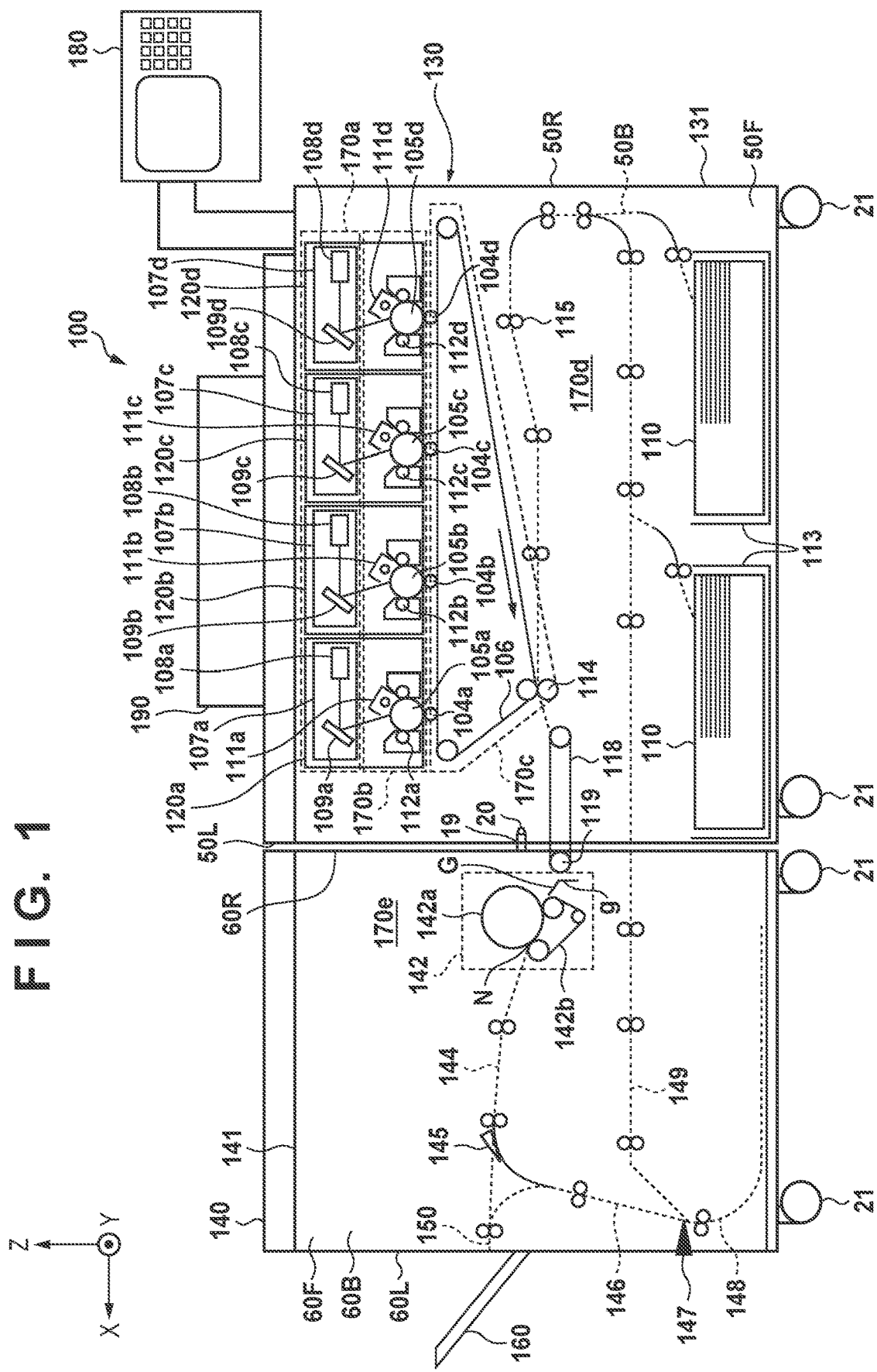
FIG. 1 is a diagram for describing an image forming apparatus that includes two chassis.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(1) Image Forming Apparatus

FIG. 1 shows an image forming apparatus 100 that uses an electrophotographic method. The height direction of the image forming apparatus 100 (the direction from a bottom surface toward a top surface) is called a Z direction. The horizontal direction of the image forming apparatus 100 is called an X direction. The depth direction of the image forming apparatus 100 (the direction from a front surface toward a back surface) is called a Y direction. An image forming process that uses the electrophotographic method includes an exposure process, a development process, a transfer process, and a fixing process.

The image forming apparatus 100 includes a first chassis 130 and a second chassis 140. The first chassis 130 and the second chassis 140 are not connected at the time of factory shipment, and become connected when installed at a customer side. The second chassis 140 includes positioning shafts 20. The positioning shafts 20 fit into positioning holes 19 of the first chassis 130.

The first chassis 130 includes a first frame 131. A lower surface of the first frame 131 is provided with a plurality of casters 21. An original reading apparatus 190 and an operation unit 180 are provided in an upper part of the first chassis 130. The original reading apparatus 190 reads an original and generates image signals. The operation unit 180 includes an input apparatus and a display apparatus.

The first chassis 130 is substantially box-shaped. The first chassis 130 includes four side surfaces, namely a right side surface 50R, a left side surface 50L, a front surface 50F, and a back surface 50B. An exposure mechanism 170a, an image forming mechanism 170b, a transfer mechanism 170c, storage compartments 113, a conveyance mechanism 170d, and the like are provided inside the first chassis 130. A plurality of sheets 110 are housed in the storage compartments 113. The conveyance mechanism 170d includes a plurality of conveyance rollers that convey sheets 110 fed from the storage compartments 113 along a conveyance path. The exposure mechanism 170a executes the exposure process. The image forming mechanism 170b executes the development process. The transfer mechanism 170c transfers toner images to sheets 110.

The exposure mechanism 170a and the image forming mechanism 170b are each divided into four image forming stations 120a, 120b, 120c, and 120d. The image forming stations 120a, 120b, 120c, and 120d respectively form toner images in Y (yellow), M (magenta), C (cyan), and K (black). The image forming stations 120a, 120b, 120c, and 120d have the same structure. Therefore, in the following description of the image forming stations 120a, 120b, 120c, and 120d, the letters a, b, c, and d appended at the end of reference signs may be omitted.

The second chassis 140 includes a second frame 141. A lower surface of the second frame 141 is provided with a plurality of casters 21. The second chassis 140 includes a fixing mechanism 170e that executes the fixing process. The second chassis 140 includes four side surfaces, namely a right side surface 60R, a left side surface 60L, a front surface 60F, and a back surface 60B.

(1-1) Exposure Process

The exposure mechanism 170a includes laser scanners 107. The laser scanners 107 include a semiconductor laser 108, a reflective mirror 109, and a non-illustrated rotational polygonal mirror. Primary chargers 111 cause the surfaces of photosensitive drums 105 to be uniformly charged. The semiconductor lasers 108 output laser beams corresponding to image signals. The laser beams are deflected by the rotational polygonal mirrors. Furthermore, the photosensitive drums 105 are exposed to the laser beams via the reflective mirrors 109. As a result, electrostatic latent images are formed on the photosensitive drums 105.

(1-2) Development Process

Developers 112 form toner images by developing the electrostatic latent images using toner.

(1-3) Transfer Process

Primary transfer members 104 transfer the toner images on the photosensitive drums 105 to an intermediate transfer member 106. The Y image, M image, C image, and K image are transferred to the intermediate transfer member 106 in an overlapping manner. As a result, a full-color image is formed. The intermediate transfer member 106 rotates, thereby conveying the toner image to a secondary transfer unit. In the secondary transfer unit, a secondary transfer roller 114 transfers the toner image on the intermediate transfer member 106 to a sheet 110.

A conveyance belt 118 conveys the sheet 110 from the first chassis 130 to the second chassis 140. The conveyance belt 118 is hung over a downstream roller 119 in a stretched state.

(1-4) Fixing Process

The fixing mechanism 170e includes a fixing device 142 for fixing the toner image transferred to the sheet 110 using heat and pressure. The fixing device 142 includes a fixing roller 142a that applies heat to the sheet 110, and a pressurizing belt 142b that causes the sheet 110 to come into contact with the fixing roller 142a under pressure. A heater is provided inside the fixing roller 142a. As a result of rotation of both of the fixing roller 142a and the pressurizing belt 142b, the toner image is fixed to the sheet 110, and in addition, the sheet 110 is conveyed from an upstream side to a downstream side.

A conveyance path 144 is provided downstream relative to the fixing device 142. In a case where an image is formed only on one surface of the sheet 110, the sheet 110 is conveyed to a discharge path 150 via the conveyance path 144 and loaded on a tray 160. In a case where an image is formed on a back surface side of the sheet 110, the sheet 110 is guided from the conveyance path 144 to a conveyance path 146 via a flapper 145. Furthermore, the sheet 110 is conveyed from the conveyance path 146 to an inversion path 148. When a sheet sensor 147 has detected a trailing edge of the sheet 110, the inversion path 148 executes a switch back operation. As a result, the conveyance direction of the sheet 110 is inverted, and the sheet 110 is conveyed to a conveyance path 149. The conveyance path 149 conveys the sheet 110 to the secondary transfer roller 114 again. The secondary transfer roller 114 transfers a toner image from the intermediate transfer member 106 to a back surface of the sheet 110. The sheet 110 passes through the fixing device 142, the conveyance path 144, and the discharge path 150, and then loaded on the tray 160.

(2) First Embodiment (2-1) Passing of Sheet Between Two Neighboring Chassis

As shown in FIG. 1, the conveyance belt 118 is provided downstream relative to the transfer mechanism 170c. The conveyance belt 118 passes a sheet 110, on which an unfixed toner image is carried, from the first chassis 130 to a directing guide G of the second chassis 140. Apart of the conveyance belt 118 projects from the first chassis 130 toward the second chassis 140. The purpose thereof is to pass the sheet 110 in a stable manner.

The pressurizing belt 142b and the fixing roller 142a form a fixing nip N. The directing guide G directs the sheet 110 passed from the conveyance belt 118 to the fixing nip N.

The directing guide G is provided between the downstream roller 119 of the conveyance belt 118 and the fixing nip N. The directing guide G and the downstream roller 119 are located so that a sheet conveyance surface of the conveyance belt 118 is higher than a starting position g of a directing surface of the directing guide G. The directing guide G has a guide function that directs a leading edge of the sheet 110 to the fixing nip N in a stable manner. Placing the leading edge of the sheet 110 too high relative to the directing guide G is an inappropriate case, which prevents the sheet 110 from being directed and guided to the fixing nip N. As a result, the sheet 110 gets wrinkled, or the sheet 110 gets stained by spattering of the unfixed toner image. If the height of the leading edge of the sheet 110 is too low relative to the directing guide G, the leading edge of the sheet 110 comes into contact with the directing guide G, thereby causing a jam.

Therefore, an error between the position of the conveyance belt 118 and a position that has been assumed design-wise in the height direction needs to be in a range of, for example, approximately ±0.7 mm. An error between the position of the directing guide G and a position that has been assumed design-wise in the height direction, too, needs to be in a range of, for example, approximately ±0.7 mm. Therefore, the accuracy of the height-direction position of connection between the second chassis 140 including the directing guide G that directs the sheet 110 to the fixing nip N and the first chassis 130 including the conveyance belt 118 needs to be high.

(2-2) Positioning of and Connection Between Two Chassis

Figure 2A:
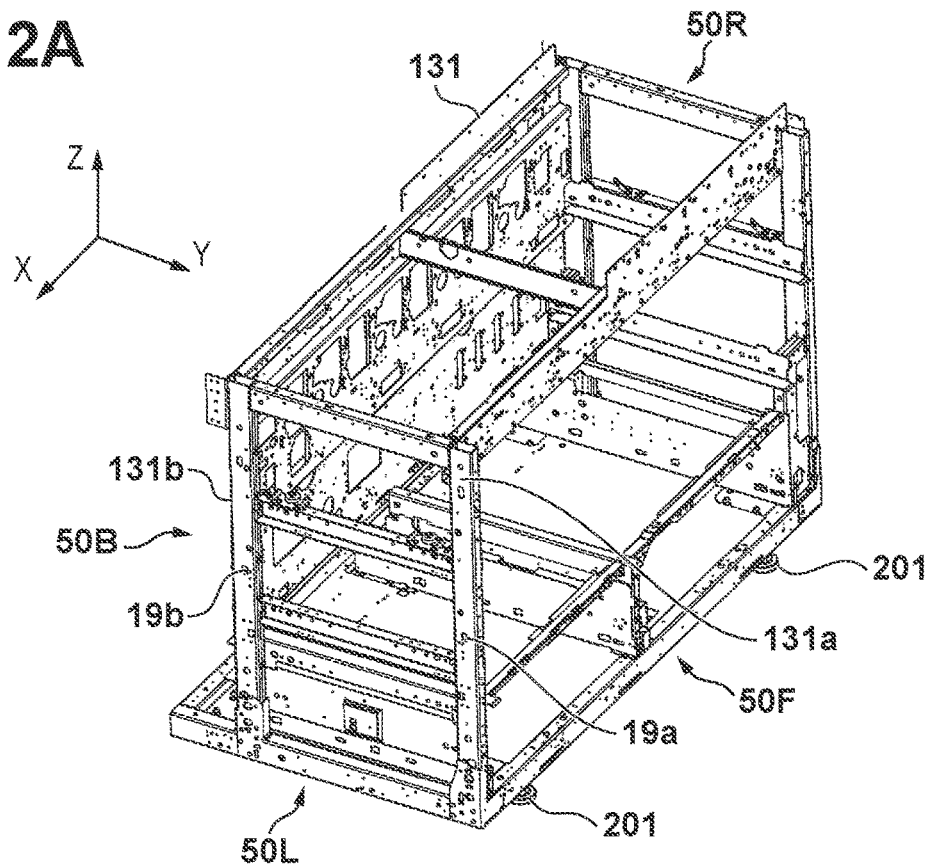
FIGS. 2A and 2B are diagrams for describing a first frame.
Figure 2B:
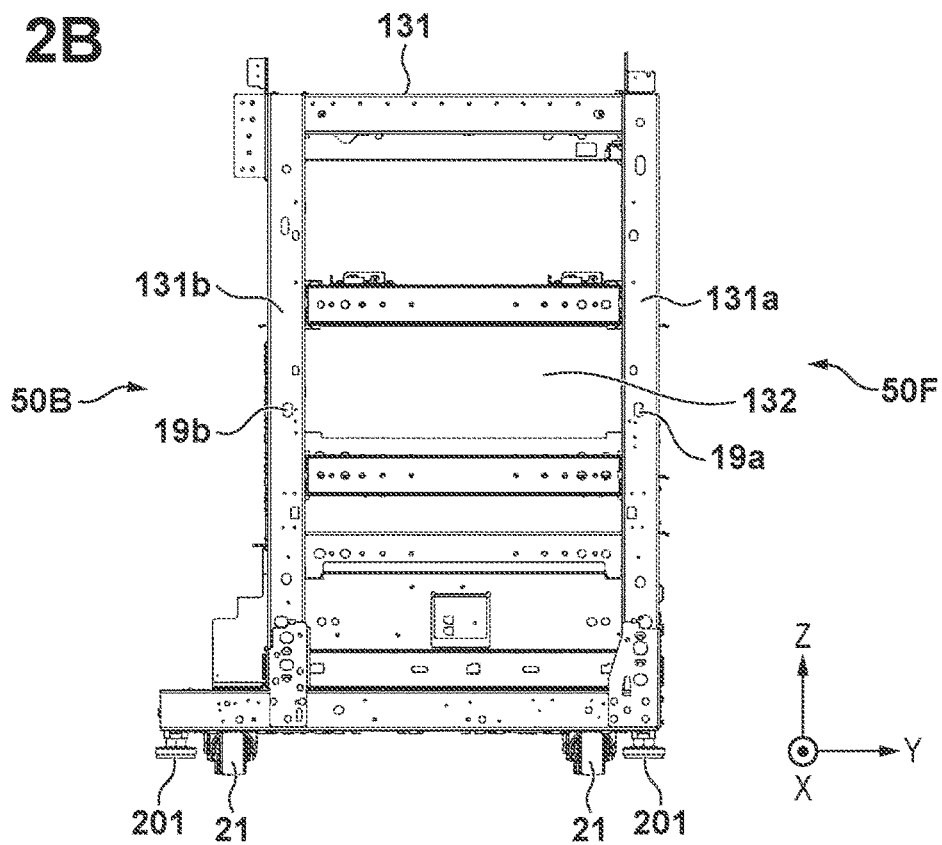
Figure 3A:
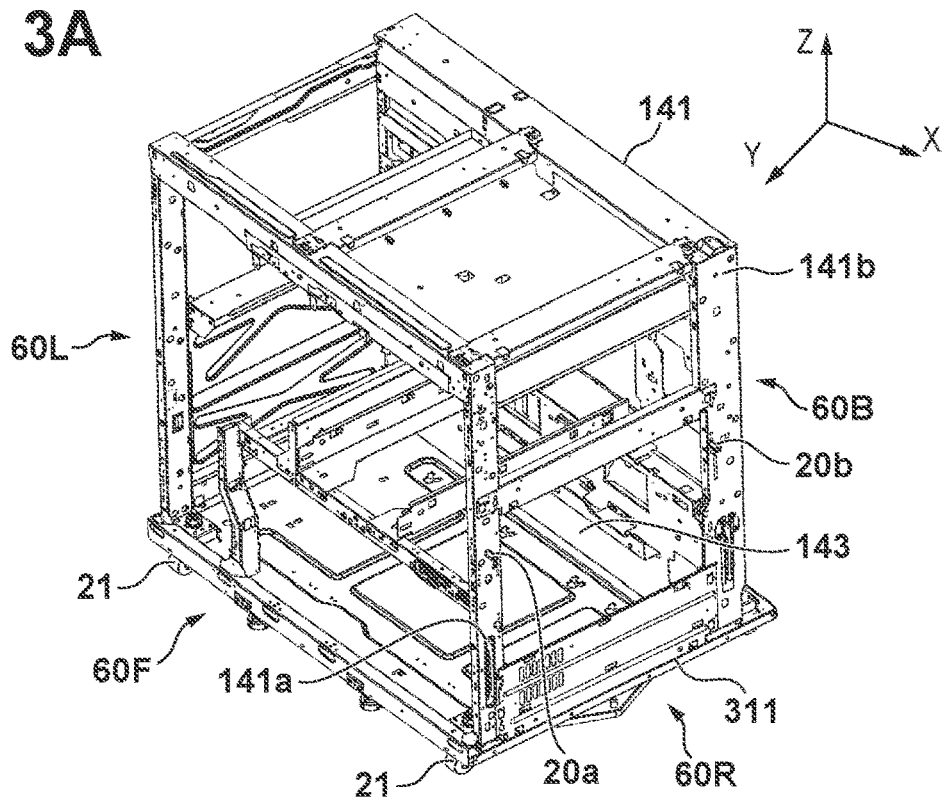
FIGS. 3A and 3B are diagrams for describing a second frame.
Figure 3B:
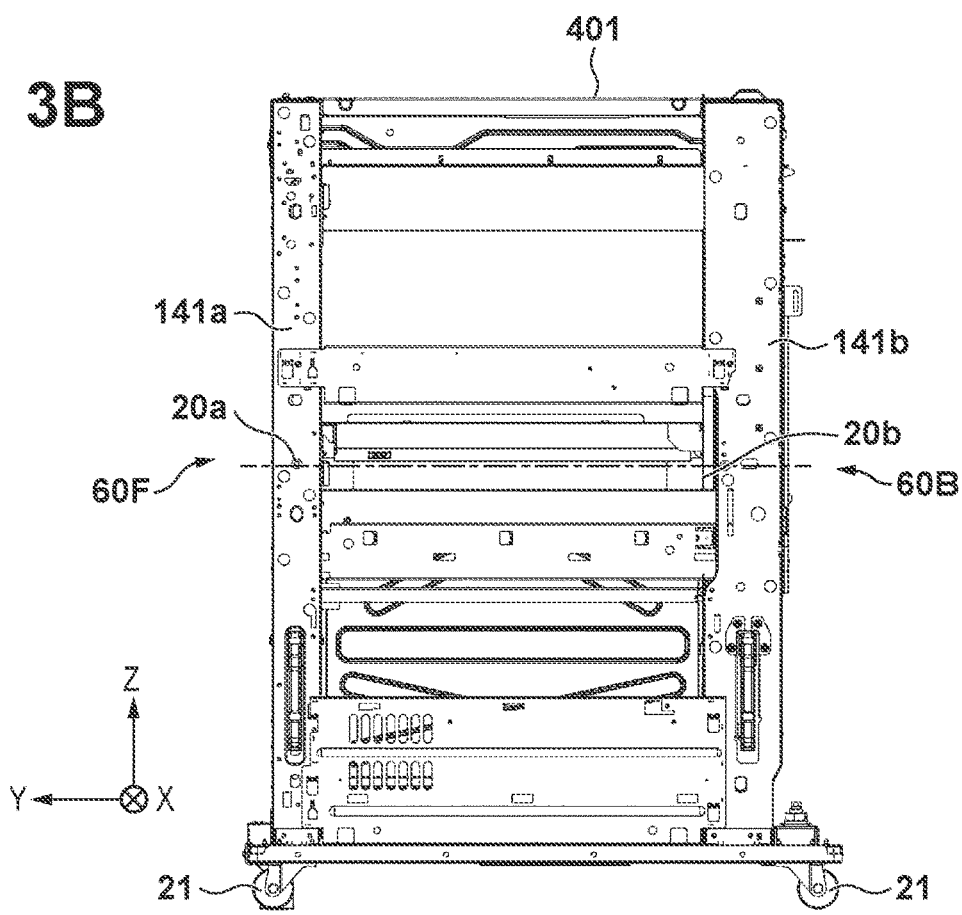

FIG. 2A is a perspective view of the first frame 131. FIG. 2B is a left side view of the first frame 131. FIG. 3A is a perspective view of the second frame 141. FIG. 3B is a right side view of the second frame 141.

Fastening devices 201 are provided on a bottom surface of the first chassis 130. The fastening devices 201 are fastened to a floor surface of a room by projecting the fastening devices 201 toward the floor surface. As a result, the first chassis 130 is fastened to the floor surface.

Next, an installation operator situates the second chassis 140 so that the right side surface 60R of the second chassis 140 and the left side surface 50L of the first chassis 130 face each other, and moves the second chassis 140 toward the first chassis 130. As a result, the second chassis 140 is connected to the first chassis 130.

As shown in FIG. 2A and FIG. 2B, the first frame 131 includes a left front support rod 131a and a left back support rod 131b. A passage opening 132 through which a sheet 110 passes is provided between the left front support rod 131a and the left back support rod 131b. The left front support rod 131a includes a positioning hole 19a. The left back support rod 131b includes a positioning hole 19b. Each of the positioning holes 19a and 19b is an oval hole that has a long diameter along the height direction.

As shown in FIG. 3A and FIG. 3B, the second frame 141 includes a right front support rod 141a and a right back support rod 141b. A passage opening 143 through which a sheet 110 passes is provided between the right front support rod 141a and the right back support rod 141b. The right front support rod 141a includes a positioning shaft 20a. The right back support rod 141b includes a positioning shaft 20b. The positioning shafts 20a and 20b project in the direction of a normal to the right side surface 60R (the X direction). The positioning shaft 20a fits into the positioning hole 19a. The positioning shaft 20b fits into the positioning hole 19b. As a result, the second chassis 140 is positioned relative to the first chassis 130. Especially, the second chassis 140 is positioned relative to the first chassis 130 in the height direction.

Regarding the depth direction (the Y direction), it is sufficient that one of the positioning shafts 20a and 20b be positioned accurately. One of the positioning hole 19a and the positioning hole 19b of the first frame 131 may be enlarged in the Y direction. For example, the dimension of the positioning hole 19a in the Y direction may be larger than the dimension of the positioning hole 19b in the Y direction.

A description is now given of the reason why the positioning holes 19a and 19b are oval holes. As can be imagined from FIG. 1, the first chassis 130 is heavier than the second chassis 140. For example, the total weight of the first chassis 130 is 700 kg, and the total weight of the second chassis 140 is 200 kg. In this case, the floor surface on which the first chassis 130 has been installed sinks down in the −Z direction compared to the floor surface on which the second chassis 140 has been installed. As a result, the positions of the positioning holes 19a and 19b can be lower than the positions of the positioning shafts 20a and 20b. In view of this, the positioning holes 19a and 19b have a shape of an oval hole. In this way, the first chassis 130 and the second chassis 140 can be joined to each other without the positioning shafts 20a and 20b interfering with the left front support rod 131a and the left back support rod 131b of the first chassis 130.

The height of the second chassis 140 relative to the first chassis 130 is adjusted using the casters 21 in order to appropriately pass a sheet 110 from the first chassis 130 to the second chassis 140.

Figure 4B:
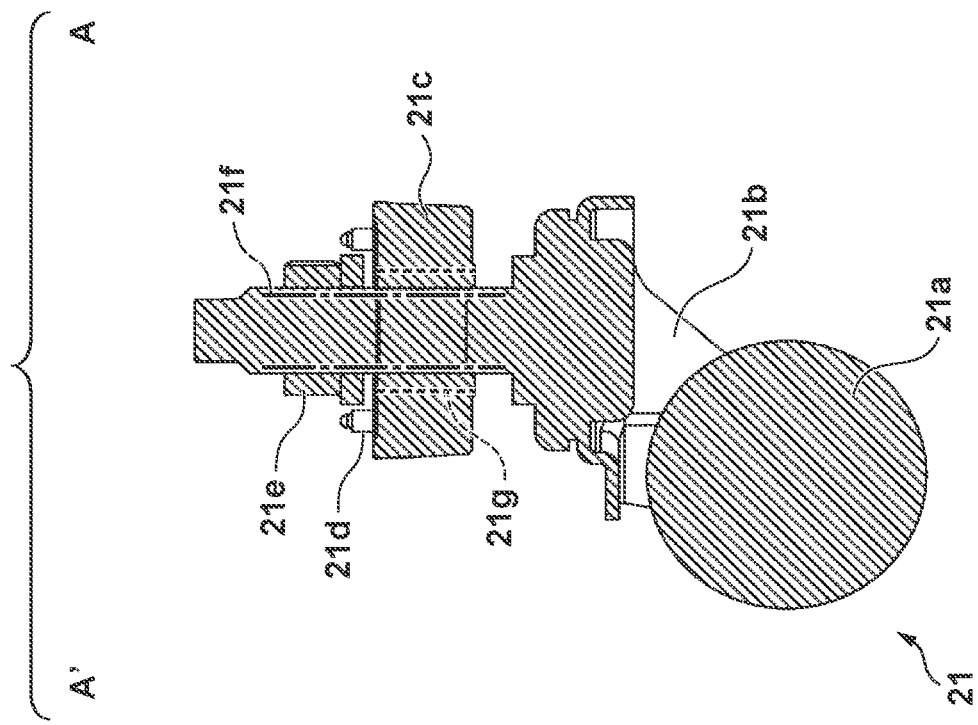
FIGS. 4A and 4B are diagrams for describing a caster.
Figure 4A:
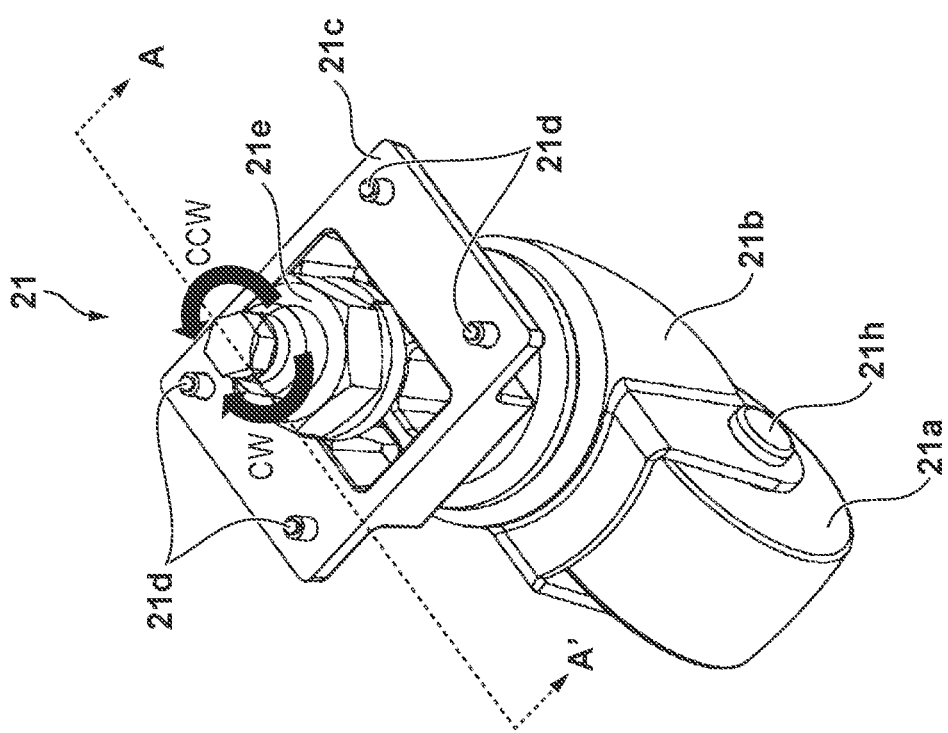

FIG. 4A is a perspective view of a caster 21. FIG. 4B is a cross-sectional view of the caster 21. The caster 21 includes a main body 21b made of steel. A wheel 21a is swivelably attached to the main body 21b via a wheel shaft 21h. A threaded portion 21f is formed in the main body 21b. The threaded portion 21f is joined to a threaded portion 21g provided in a mount 21c. Meanwhile, the mount 21c is fastened to a bottom surface frame 311 of the second chassis 140 via four screws 21d. In order to prevent separation of the threaded portion 21f from the mount 21c, the threaded portion 21f is joined to the mount 21c via a nut 21e.

In a case where the height of the caster 21 is to be adjusted, the nut 21e is loosened first. Next, the main body 21b is rotated in the CW direction. As a result, the threaded portion 21f moves relative to the threaded portion 21g, and the wheel 21a approaches the mount 21c. That is to say, the second chassis 140 becomes relatively low compared to the first chassis 130.

Rotating the main body 21b in the CCW direction makes the second chassis 140 relatively high compared to the first chassis 130. In a case where the first chassis 130 has sunk down compared to the second chassis 140, the main body 21b is rotated in the CCW direction to align the first chassis 130 and the second chassis 140 in the height direction.

FIG. 5A is a front view showing a state of connection between the first frame 131 and the second frame 141. FIG. 5B is a back view showing a state of connection between the first frame 131 and the second frame 141. The first chassis 130 and the second chassis 140 are connected to each other by two connectors Pa and Pb. Specifically, the connector Pa connects together the left front support rod 131a and the right front support rod 141a. The connector Pb connects together the left back support rod 131b and the right back support rod 141b.

(2-3) Influence of Floor Surface when Connecting Two Chassis to Each Other

Once the second chassis 140 has been joined to the first chassis 130 and the height adjustment using the casters 21 has been completed, the first chassis 130 and the second chassis 140 are connected to each other via the two connectors Pa and Pb.

Incidentally, the height adjustment that uses the casters 21 alone may cause the horizontal angle formed by the second chassis 140 together with the first chassis 130 to deviate from a horizontal angle that has been assumed design-wise. Therefore, the connectors Pa and Pb need to include a fine adjustment mechanism.

Figure 6A:
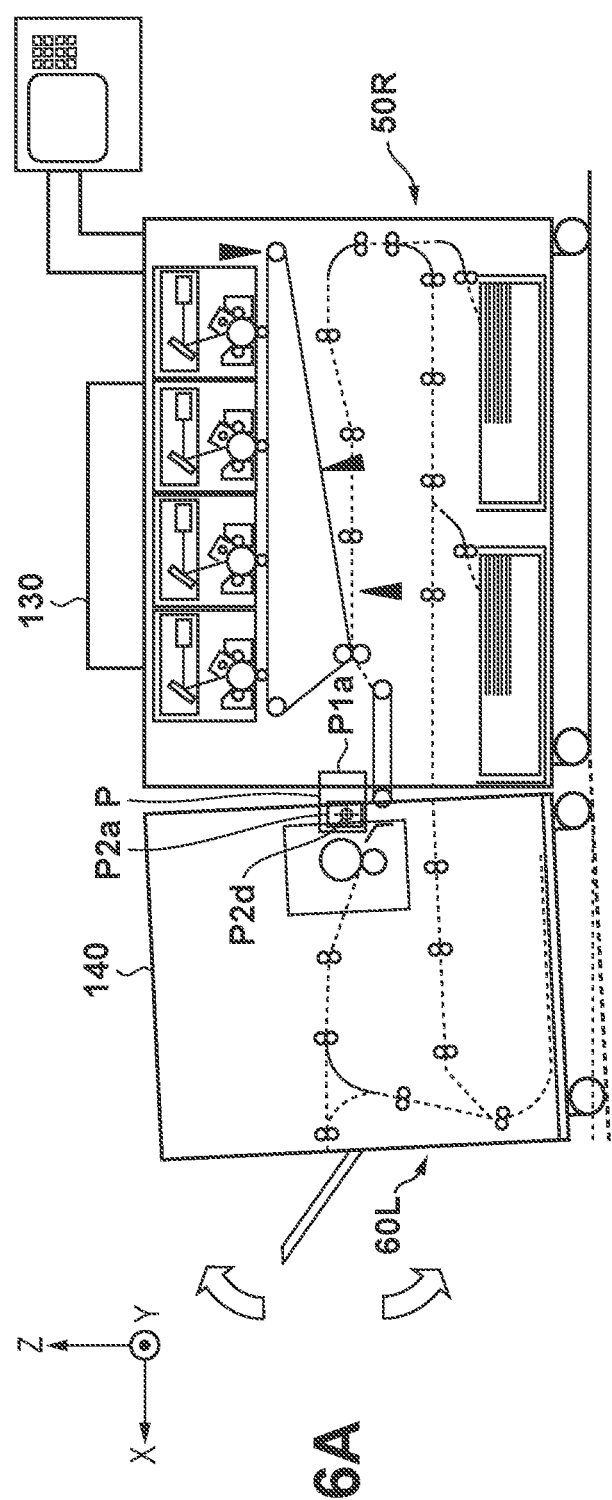
FIGS. 6A and 6B are diagrams for describing a comparative example.
Figure 6B:
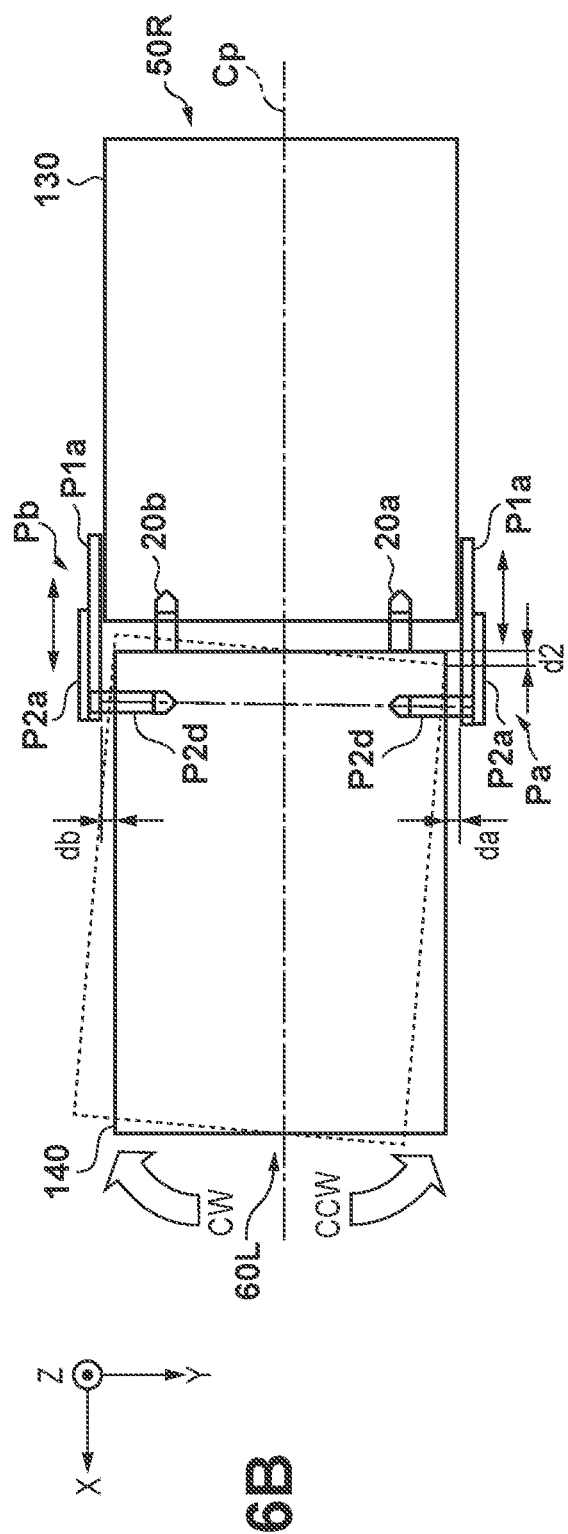

FIG. 6A and FIG. 6B are diagrams for describing the connectors Pa and Pb according to a comparative example. Especially, the connector Pb is realized by two hinges. As shown in FIG. 6A, it is assumed that the floor surface located beneath the second chassis 140 is inclined as indicated by a dash line. In this case, the second chassis 140 also becomes inclined along the floor. Although adjusting the casters 21 alleviates the inclination of the second chassis 140 to some extent, it is difficult to achieve an exactly level placement of the second chassis 140.

Furthermore, in a case where the second chassis 140 is inclined relative to the first chassis 130, a load F is applied to the connector Pb. This may consequently damage the connector Pb. In addition, as shown in FIG. 6B, if an operator attempts to pivot the second frame 141 around the connector Pb in the CW direction or the CCW direction, the pivot resistance of the second chassis 140 increases due to the load F applied to the connector Pb. This makes it difficult for the operator to make the angle adjustment.

Figures 7A, 7B:
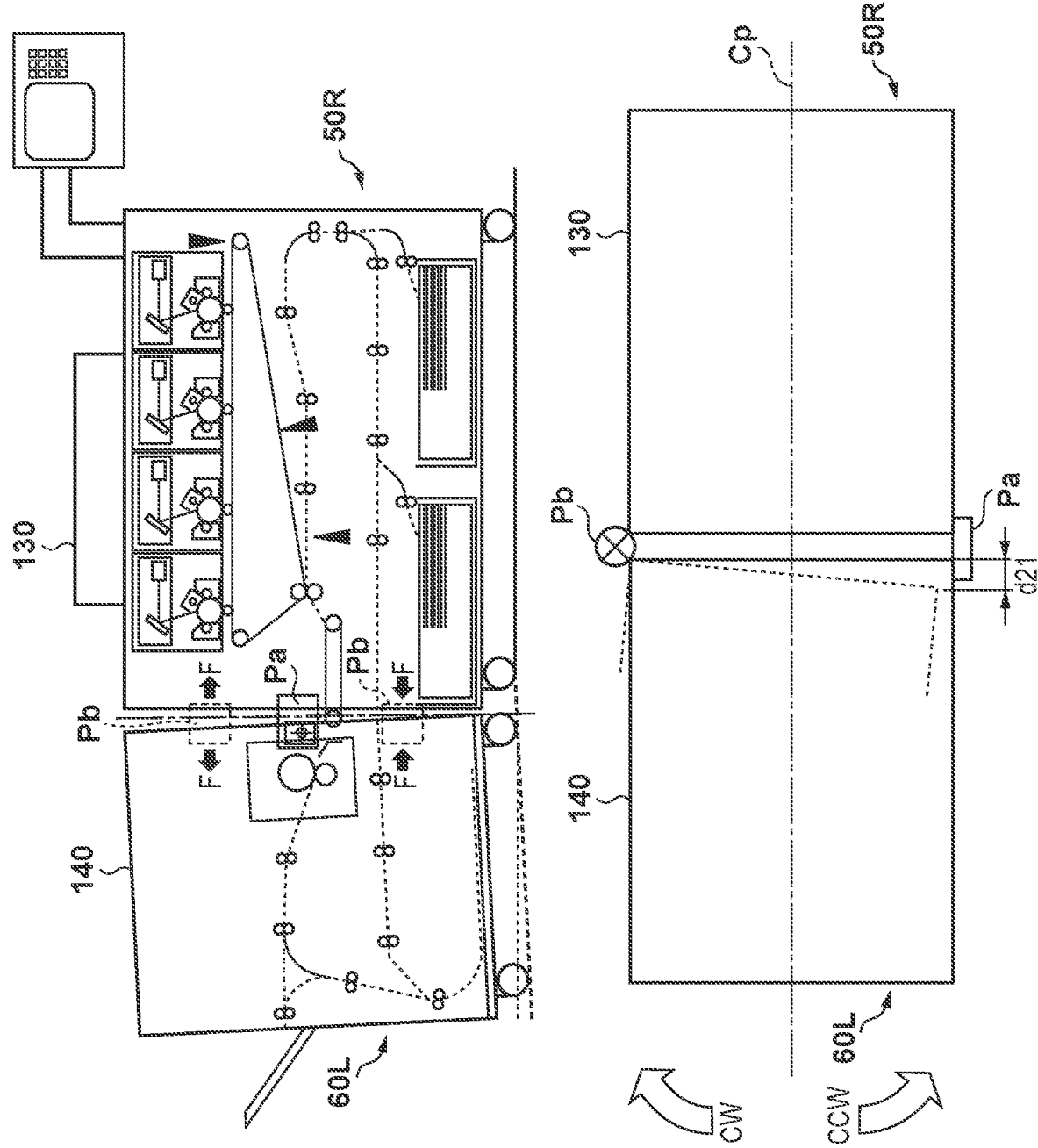
FIGS. 7A and 7B are diagrams for describing an embodiment.

FIG. 7A and FIG. 7B are diagrams for describing the connection between the first chassis 130 and the second chassis 140 via two connectors P (connectors Pa and Pb) that have been improved. As shown in FIG. 7B, although the two connectors Pa and Pb are components having the same shape, they are joined to the first chassis 130 and the second chassis 140 in such a manner that their vertical orientations are reverse of each other. By using the same components as the two connectors Pa and Pb, the manufacturing cost of the two connectors Pa and Pb is reduced. Note that as a plurality of components that constitute the two connectors Pa and Pb are the same components, they are given the same reference signs.

Each of the connectors Pa and Pb includes a first connector component P1a and a second connector component P2a. The second connector component P2a includes a shaft portion P2d. The shaft portion P2d projects in the Y direction, and fits into the first connector component P1a and the second frame 141. Note that on the front surface side, a gap da is ensured between the first connector component P1a and the second chassis 140. On the back surface side, a gap db is ensured between the first connector component P1a and the second chassis 140.

In a case where the floor is inclined as shown in FIG. 7A, the second chassis 140 pivots around the shaft portions P2d. Therefore, a load is not easily applied to the connectors Pa and Pb. Therefore, the improved connectors Pa and Pb according to the first embodiment are not easily damaged.

In a case where the floor surface is not level, the second chassis 140 tends to pivot around the Y axis. In view of this, the connectors Pa and Pb are provided in the vicinity of the conveyance belt 118, the fixing device 142, and the directing guide G. That is to say, a pivot axis around the Y axis exists in the vicinity of the passage openings 132 and 142 for sheets 110. Therefore, the displacements in the vicinity of the conveyance belt 118, the fixing device 142, and the directing guide G are reduced, thereby allowing sheets 110 to be passed with high accuracy.

Incidentally, as shown in FIG. 6A and FIG. 6B, the pivot center of Z-axis rotation of the second chassis 140 according to the comparative example is in the hinge (connector Pb). Therefore, in the comparative example, if the angle of the second chassis 140 is changed, a gap d1 between the first chassis 130 and the second chassis 140 also increases accordingly.

On the other hand, as shown in FIG. 7A and FIG. 7B, according to the first embodiment, the angle adjustment is executed with the connectors Pa and Pb on both of the front surface side and the back surface side of the second chassis 140. Therefore, a gap d2 between the first chassis 130 and the second chassis 140 becomes smaller than the gap d1 according to the comparative example. In this way, when the gap in the X direction is small, the integrity of the external design is maintained even if the angle adjustment has been made to the first chassis 130 and the second chassis 140 around the Z axis.

(2-4) Connection Method

Figure 8A:
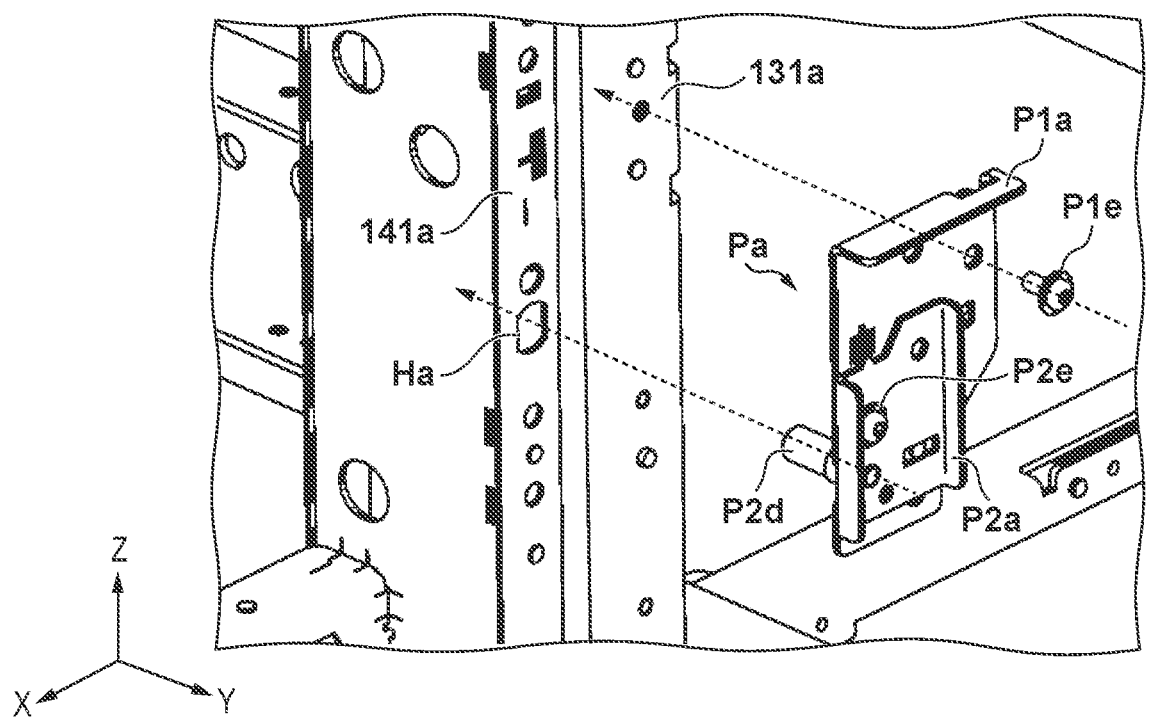
FIGS. 8A and 8B are diagrams for describing connectors.
Figure 8B:
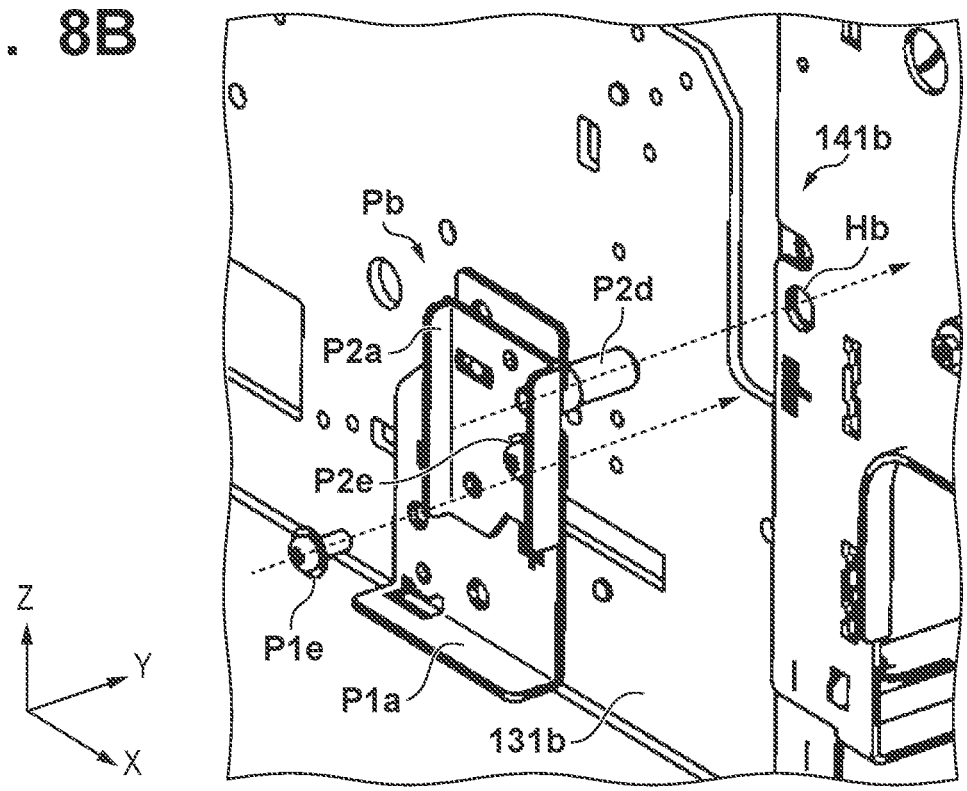

FIG. 8A shows the details of the connector Pa. FIG. 8B shows the details of the connector Pb. As shown in FIG. 8A, the connector Pa connects together the front surface 50F of the first chassis 130 and the front surface 60F of the second chassis 140. As shown in FIG. 8B, the connector Pb connects together the back surface 50B of the first chassis 130 and the back surface 60B of the second chassis 140.

First, the first connector component P1a of the connector Pa is fastened to the left front support rod 131a of the first frame 131 via a fastener P1e (e.g., a screw or a threaded member). Similarly, the first connector component P1a of the connector Pb is fastened to the left back support rod 131b of the first frame 131 via a fastener P1e (e.g., a screw or a threaded member).

The second connector component P2a is fastened to the first connector component P1a via a fastener P2e (e.g., a screw or a threaded member). The connector component P2a includes a shaft portion P2d that has been formed integrally with the connector component P2a. The shaft portion P2d of the connector Pa is fitted into a connection hole Ha provided in the right front support rod 141a of the second frame 141. The shaft portion P2d of the connector Pb is fitted into a connection hole Hb provided in the right back support rod 141b of the second frame 141. As a result, the second frame 141 is positioned relative to the first frame 131 in the X direction. The connection holes Ha and Hb are oval holes that have a long diameter along the height direction, for the same reason as the positioning holes 19a and 19b.

(2-5) Detailed Structure of Connectors

FIG. 9A to FIG. 9D show a structure of the connectors Pa and Pb according to the first embodiment. The second connector component P2a includes an indicator P2c with a triangle shape. On the other hand, the first connector component P1a includes markings P1c corresponding to the indicator P2c. The markings P1c include groove-like vertical lines P1f that have been formed at an equal interval. The indicator P2c and the markings P1c can be indexes in adjusting the horizontal angle between the first chassis 130 and the second chassis 140.

The second connector component P2a includes a long hole portion P2b. The first connector component P1a includes an embossed portion P1b that is intended to be inserted or fit into the long hole portion P2b. The embossed portion P1b is a shaft-like projection. Relative movement of the embossed portion P1b in the long hole portion P2b enables relative movement of the first connector component P1a and the second connector component P2a in the X direction. That is to say, the long hole portion P2b has a long diameter along the X direction.

The shaft portion P2d has been joined to and integrated with the second connector component P2a. The shaft portion P2d is movable along a guiding groove P1d provided in the first connector component P1a. The guiding groove P1d and the long hole portion P2b are provided substantially parallel to each other. Therefore, when the embossed portion P1b moves along the long hole portion P2b, the shaft portion P2d moves along the guiding groove P1d. In this way, the first connector component P1a and the second connector component P2a can move in the X direction without rotating.

Figure 9A:
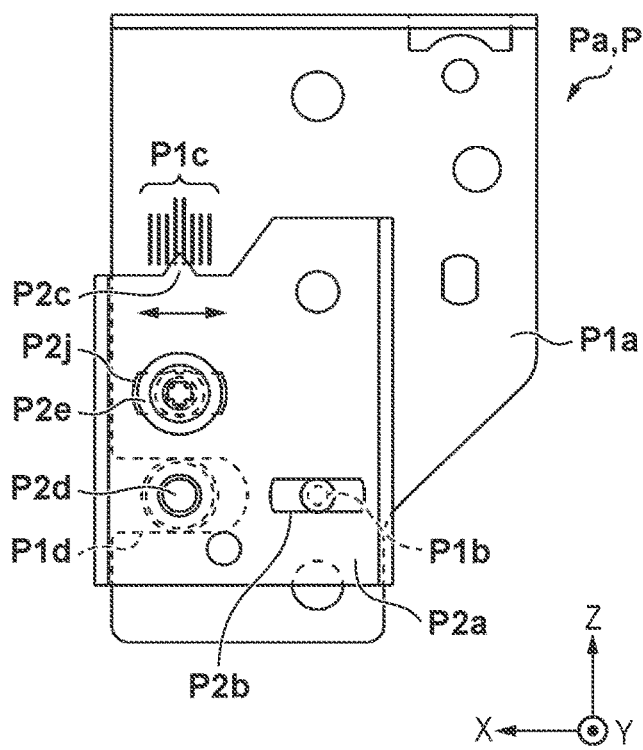
FIGS. 9A to 9D are diagrams for describing the connectors.
Figure 9B:
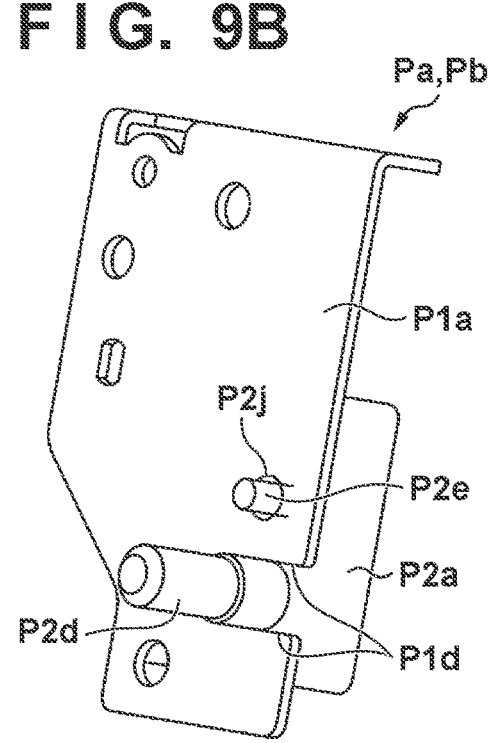
Figure 9C:
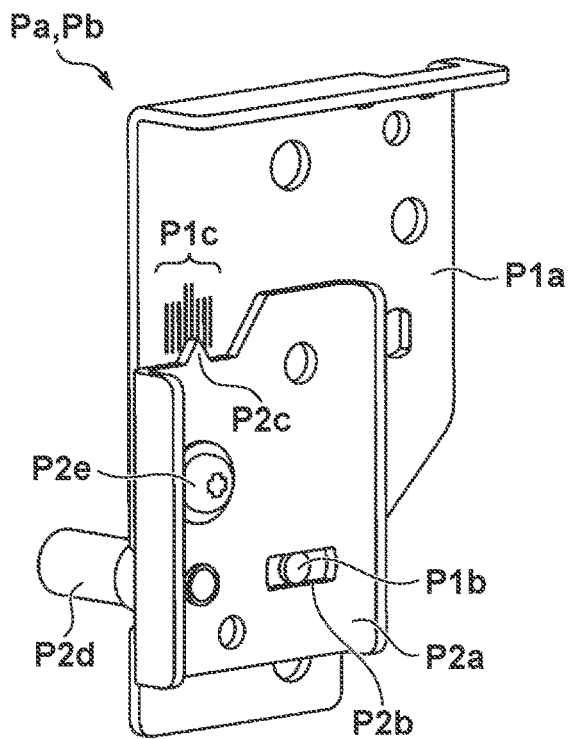
Figure 9D:
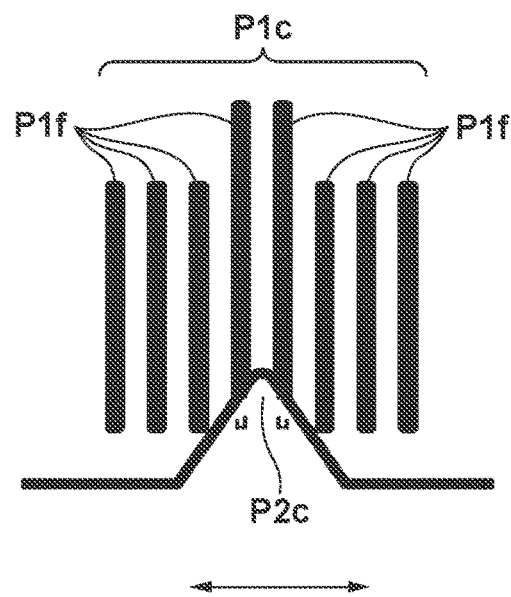

As shown in FIG. 9D, the indicator P2c provided on one end of the second connector component P2a indicates the markings P1c provided on the first connector component P1a. The markings P1c include, for example, a plurality of vertical lines P1f that have been formed at an interval of 1 mm by stamping and the like.

As stated earlier, the first connector component P1a and the second connector component P2a can relatively move in the X direction while the embossed portion P1b is restrained by the long hole portion P2b and the shaft portion P2d is restrained by the guiding groove P1d. The amount of this movement can be adjusted by pointing the indicator P2c to one of the vertical lines P1f. Once the adjustment has been completed, the first connector component P1a and the second connector component P2a are fixed to each other via the fastener P2e. When the plurality of vertical lines P1f have been formed at an interval of 1 mm, the relative positions of the first connector component P1a and the second connector component P2a can also be adjusted at an interval of 1 mm. Note that 1 mm is merely an example, and the interval among the plurality of vertical lines P1f may be smaller than 1 mm, or may exceed 1 mm.

As shown in FIG. 9D, among the plurality of lines P1f, the two lines P1f at the center may be longer in length than the six lines P1f arranged at the ends. The two lines P1f at the center indicate an initial position between the first chassis 130 and the second chassis 140 that has been assumed design-wise (a position before the angle adjustment).

(2-6) Position Adjustment Between Two Chassis

The following describes a procedure of the angle adjustment between the first chassis 130 and the second chassis 140 around the Z axis. As stated earlier, two neighboring chassis (the first chassis 130 and the second chassis 140) are connected in a state where the two chassis have been aligned in orientation. However, there are cases where an appropriate angular relationship is not established between a sheet processing unit provided inside one chassis and a sheet processing unit provided inside another chassis. For example, in a case where processing is executed continuously with respect to a plurality of sheets 110, the angle formed by the secondary transfer roller 114 and the fixing device 142 needs to be maintained at an appropriate angle. Similarly, the angle formed by the conveyance belt 118 and the fixing device 142, too, needs to be maintained at an appropriate angle. There are cases where these two sheet processing units are required to be parallel to each other, as well as cases where they are required to form a predetermined angle. However, a certain angular relationship that has been assumed design-wise may not be established even if the two chassis have been simply oriented to be parallel to each other. In contrast, it is also possible to mount a mechanism that adjusts the angle of the sheet processing unit inside one chassis, and a mechanism that adjusts the angle of the sheet processing unit inside another chassis. However, restrictions on the sizes of the two chassis may cause difficulty in mounting these mechanisms on the two chassis. Even if the adjustment mechanisms have been respectively mounted on the two chassis, the adjustment thereof is expected to be extremely complicated for an operator.

In a case where the angle formed by the two sheet processing units is not appropriate, the following problem can arise. For example, assume that the angle formed by the fixing device 142 and the conveyance belt 118 is not appropriate. In this case, when a sheet 110 enters the fixing nip N, the sheet 110 gets twisted. As a result, the sheet 110 gets wrinkled, or a toner image on the sheet 110 gets uneven. Alternatively, the degree of alignment of a plurality of sheets 110 discharged from the discharge path 150 to the tray 160, or the degree of alignment of the sheets 110 relative to the tray 160, can decrease.

FIG. 10 shows an adjustment procedure executed by an operator. In step S1001, the operator forms an image on a sheet 110 by controlling the image forming apparatus 100 via the operation unit 180.

In step S1002, the operator measures the degree of alignment, wrinkles, and image unevenness of the sheet 110 output from the image forming apparatus 100 to the tray 160. For example, the operator may instruct the image forming apparatus 100 to stop the conveyance of the sheet 110 via the operation unit 180 at a timing when a leading edge of the sheet 110 has been discharged from the discharge path 150 to the outside of the image forming apparatus 100. The operator measures the amount of displacement of the sheet 110 in the Y direction.

In step S1003, the operator determines whether the measurement result is favorable. If the measurement result is favorable, the operator terminates the adjustment operation. On the other hand, if the measurement result is not favorable, the operator proceeds to processing of step S1004. The case where the measurement result is not favorable is, for example, a case where the amount of displacement of the sheet 110 in the Y direction has deviated from a pass range.

In step S1004, the operator adjusts the two connectors Pa and Pb. Thereafter, the operator returns to step S1001 from step S1004, and forms an image on the next sheet 110. Then, steps S1002 to S1004 are repeated. Steps S1001 to S1004 are repeated until the amount of displacement falls in the pass range.

Figure 11A:
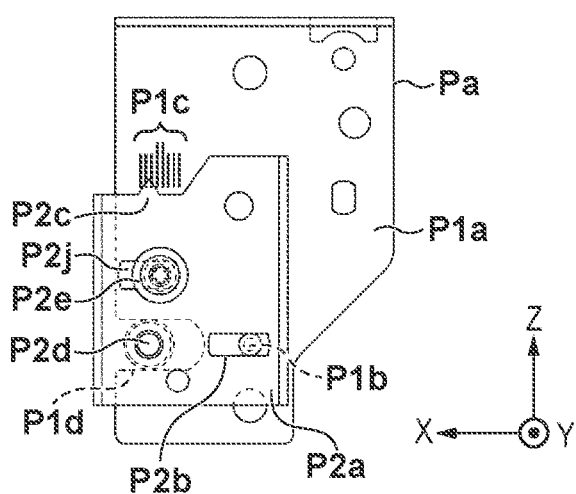
FIGS. 11A to 11E are diagrams for describing a process of adjustment using the connectors.
Figure 11B:
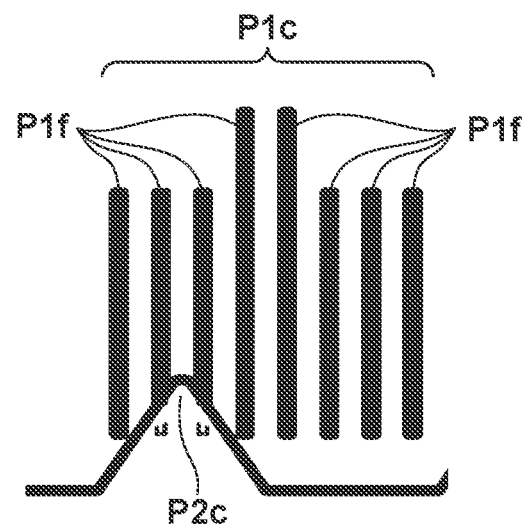

FIG. 11A to FIG. 11D show a method of adjusting the connectors Pa and Pb when causing the second chassis 140 to pivot around the Z axis relative to the first chassis 130. Although FIG. 11A and FIG. 11C only show the connector Pa, the method of adjusting the connector Pb is the same as the method of adjusting the connector Pa as the connector Pb has the same shape as the connector Pa. FIG. 11E shows the angle adjustment of the first chassis 130 and the second chassis 140 as viewed from the top surface side.

The first chassis 130 is heavier than the second chassis 140. Therefore, once the first chassis 130 has been fixed to the floor, it is difficult to readjust the first chassis 130. For this reason, an operator changes the angle of the second chassis 140 around the Z axis relative to the first chassis 130.

The operator loosens the fastener P2e via which the first connector component P1a of the connector Pa is fixed to the right front support rod 141a of the second chassis 140. The operator loosens the fastener P2e via which the first connector component P1a of the connector Pb is fixed to the right back support rod 141b of the second chassis 140.

The operator moves both of the connector Pa on the front surface side and the connector Pb on the back surface side in the same direction by the same distance. For example, as shown in FIG. 11A and FIG. 11B, the operator moves the connector component P2a in the +X direction in increments of 1 mm relative to the connector component P1a. In this case, as shown in FIG. 11E, the second chassis 140 pivots clockwise (in the CW direction).

Figure 11C:
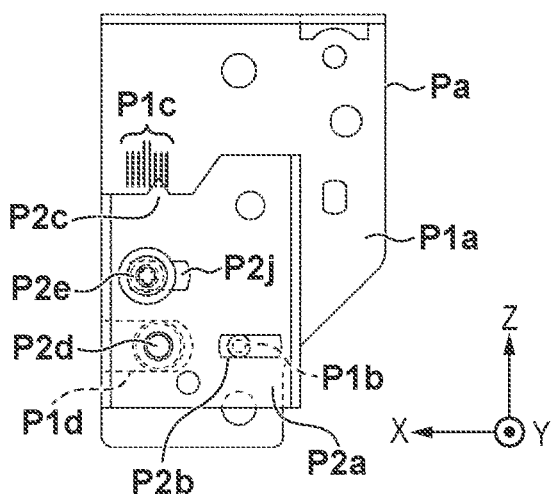
Figure 11D:
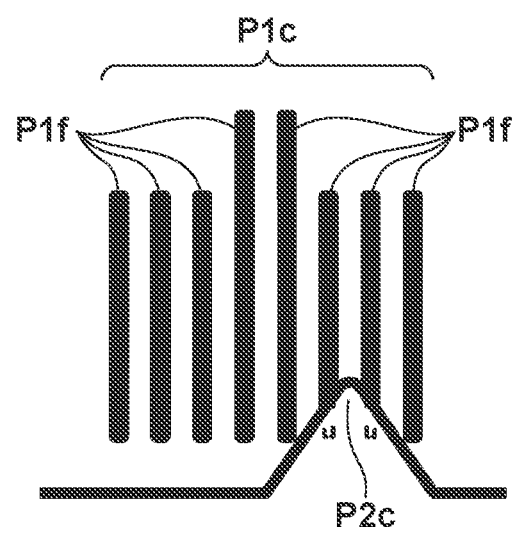
Figure 11E:
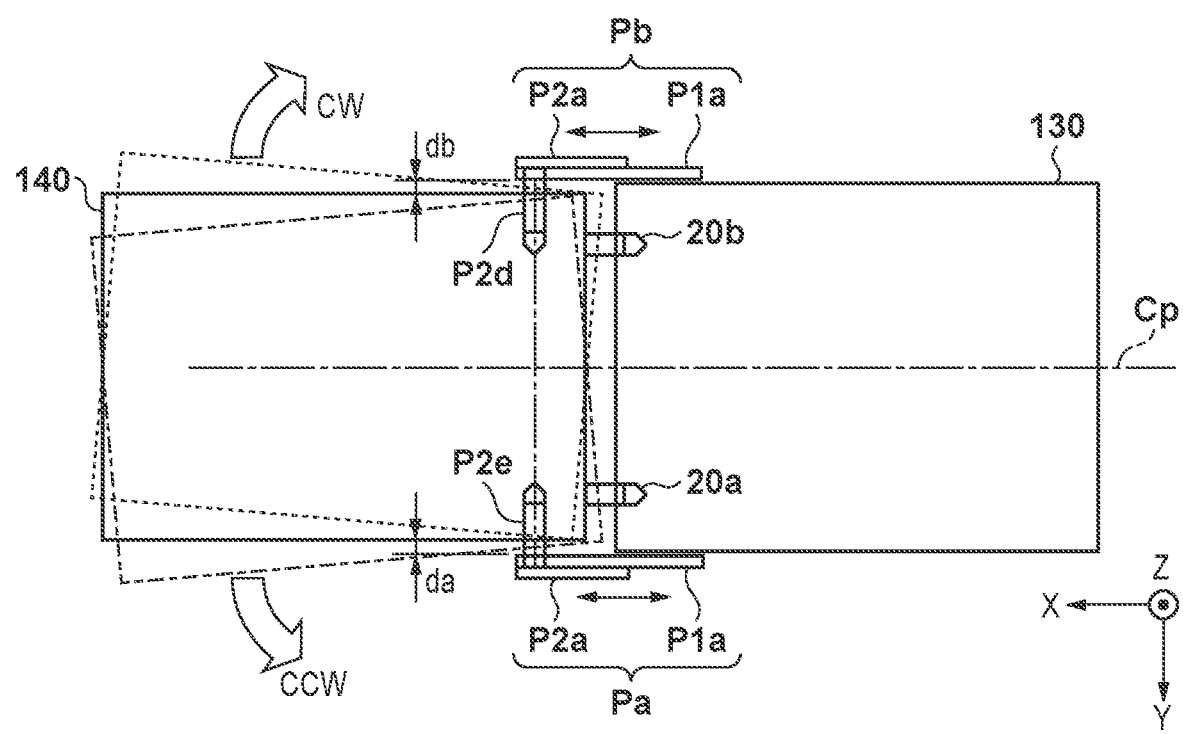

As shown in FIG. 11C and FIG. 11D, the operator moves the connector component P2a in the −X direction in increments of 1 mm relative to the connector component P1a. In this case, as shown in FIG. 11E, the second chassis 140 pivots counterclockwise (in the CCW direction).

As shown in FIG. 11E, the two connectors Pa and Pb are both placed at an equal distance from a conveyance center line Cp of sheets 110. In this case, the second chassis 140 can pivot with one point on the conveyance center line Cp acting as an origin.

Once the angle adjustment of the second chassis 140 relative to the first chassis 130 has been completed, the operator tightens both of the fastener P2e on the back surface side and the fastener P2e on the front surface side. As a result, the second chassis 140 is fixed to the first chassis 130.

As shown in FIG. 11E, there is a gap da between the connector Pa and the right front support rod 141a, and there is a gap db between the connector Pb and the right back support rod 141b. The gap da prevents interference between the connector Pa and the right front support rod 141a when the operator has caused the second chassis 140 to pivot relative to the first chassis 130. The gap dd prevents interference between the connector Pb and the right back support rod 141b when the operator has caused the second chassis 140 to pivot relative to the first chassis 130.

(3) Second Embodiment

Figure 12A:
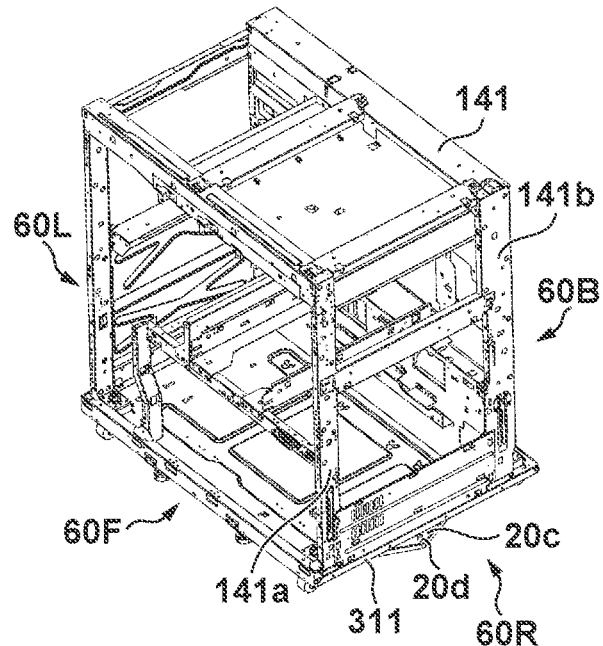
FIGS. 12A to 12D are diagrams for describing a second embodiment.
Figure 12B:
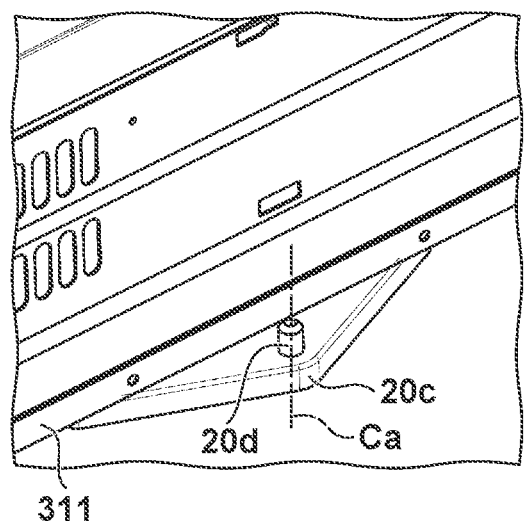
Figure 12C:
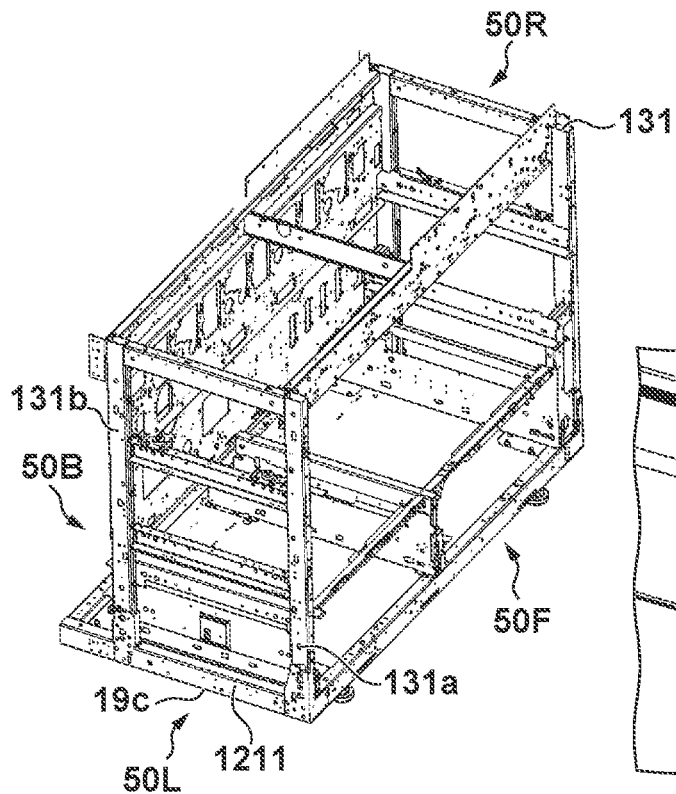
Figure 12D:
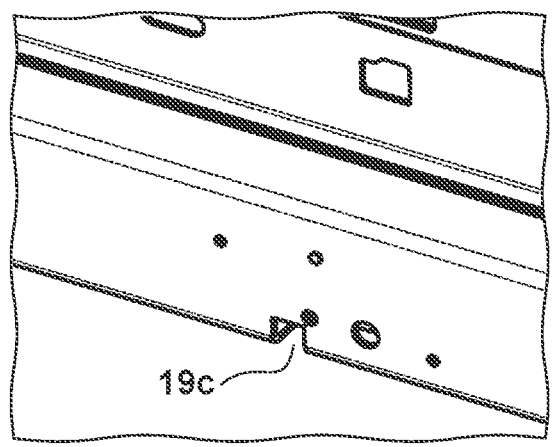

A second embodiment 2 pertains to an assistance structure that assists the second chassis 140 in pivoting relative to the first chassis 130. FIG. 12A shows the second frame 141 according to the second embodiment. FIG. 12B shows a support table 20c that has been fixed to or integrated with the bottom surface frame 311, and a pivot shaft 20d. FIG. 12C shows the first frame 131 according to the second embodiment. FIG. 12D shows a recess 19c provided in a bottom surface frame 1211 of the first frame 131. The position of the recess 19c, the position of the pivot shaft 20d, the size of a guiding groove of the recess 19c, and the height and diameter of the pivot shaft 20d have been designed so that the pivot shaft 20d fits in the recess 19c.

Figure 13:
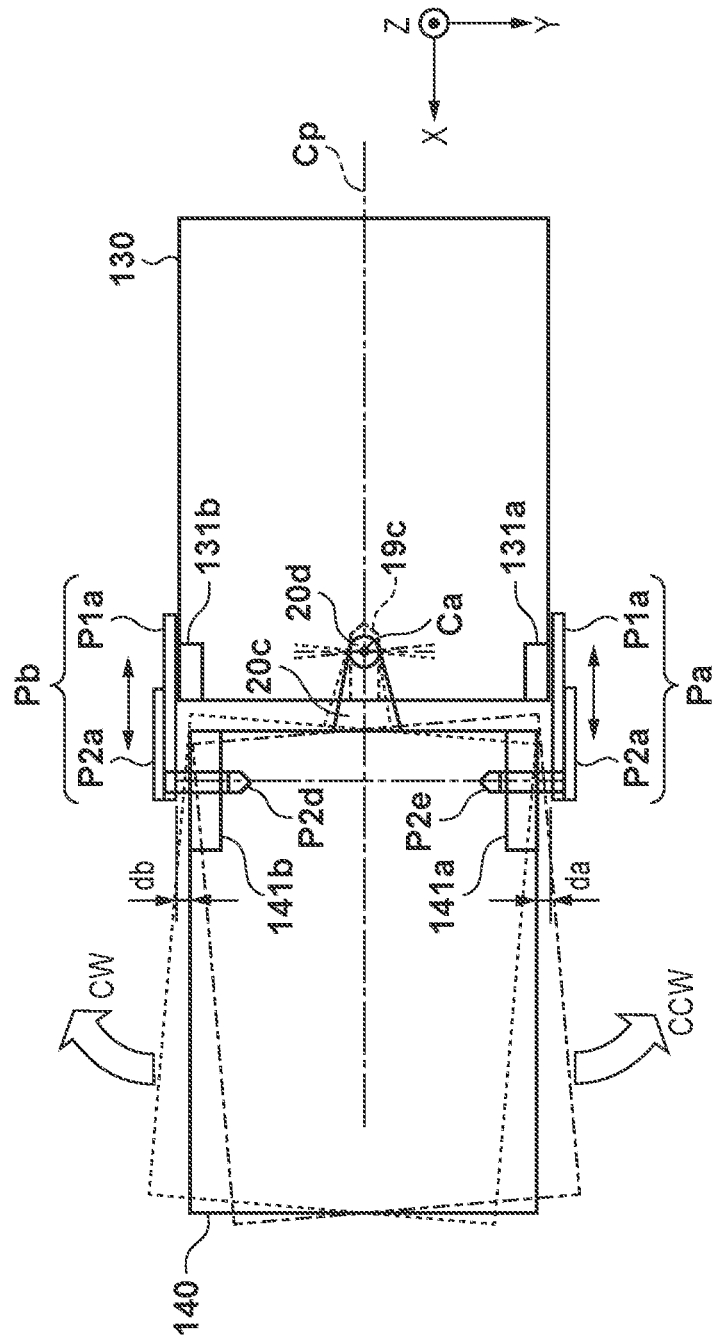
FIG. 13 is a diagram for describing a process of adjustment according to the second embodiment.

FIG. 13 is a plan view showing a state where the angle adjustment is executed while the first chassis 130 and the second chassis 140 are connected to each other.

As shown in FIG. 12A and FIG. 12B, the support table 20c that projects toward the first frame 131 is provided in a lower part of the second frame 141. The support table 20c is, for example, fixed to the bottom surface frame 311 of the second frame 141 via a fastener (e.g., a screw) and the like. The pivot shaft 20d that extends parallel to the Z direction is provided on the support table 20c.

As shown in FIG. 13, the position of the pivot shaft 20d in the Y direction coincides with the conveyance center line Cp. For example, the distance from the back surface 60B of the second chassis 140 to the pivot shaft 20d is substantially equal to the distance from the front surface 60F of the second chassis 140 to the pivot shaft 20d. Alternatively, the distance from the right back support rod 141b to the pivot shaft 20d is substantially equal to the distance from the right front support rod 141a to the pivot shaft 20d.

Incidentally, as shown in FIG. 12C and FIG. 12D, the recess 19c that determines the position of the pivot shaft 20d is formed in a lower part of the first frame 131. As shown in FIG. 13, the central position of the recess 19c in the Y direction also coincides with the conveyance center line Cp.

In the process of positioning of the second chassis 140 in the X direction relative to the first chassis 130, the pivot shaft 20d is positioned by being directed and guided to the recess 19c. The method of adjusting the angle between the first chassis 130 and the second chassis 140 around the Z axis according to the second embodiment is the same as the method according to the first embodiment. However, when an operator causes the second chassis 140 to pivot in the CW direction or the CCW direction, the pivot shaft 20d is pivotably held by the recess 19c. That is to say, the pivot shaft 20d and the recess 19c form an assistance structure that assists the second chassis 140 in pivoting relative to the first chassis 130.

(4) Others

The first and second embodiments cause the second chassis 140 to pivot substantially around the Z axis relative to the first chassis 130. Especially, as the connectors Pa and Pb are adopted, the pivot center of the second chassis 140 relative to the first chassis 130 exists in the vicinity of the center of the site of connection between the first chassis 130 and the second chassis 140. This makes it possible to install the image forming apparatus 100 flexibly relative to the inclination of the floor surface. That is to say, even if the inclination of the floor surface of the first chassis 130 is different from the inclination of the floor surface of the second chassis 140, the angle formed by the first chassis 130 and the second chassis 140 can be adjusted appropriately.

As the pivot center of the second chassis 140 exists in the vicinity of the center of the site of connection between the first chassis 130 and the second chassis 140, the amount of fluctuation in a gap between the first chassis 130 and the second chassis 140, which is caused by the angle adjustment around the Z axis, is reduced compared to a conventional case.

The connectors Pa and Pb are provided with the indicator and markings that are helpful in adjusting the pivot angle around the Z axis. In this way, the pivot angle can be adjusted accurately.

In the first and second embodiments, the first chassis 130 includes a processing unit that executes the exposure process, the development process, and the transfer process, and the second chassis 140 includes a processing unit that executes the fixing process; however, this is merely an example. For example, the first chassis 130 may include a processing unit that executes the exposure process, the development process, the transfer process, and the fixing process, and the second chassis 140 may include a processing unit that executes postprocessing with respect to sheets, or a processing unit that sorts and discharges the sheets. Alternatively, the first chassis 130 may include a processing unit that feeds sheets, and the second chassis 140 may include processing that executes the exposure process, the development process, the transfer process, and the fixing process. As described above, a plurality of processing units that are involved in image formation may be distributed to a plurality of chassis using any method.

Although the electrophotographic method is adopted as the image forming method, this is also a mere example. The image forming method may be, for example, another image forming method, such as an inkjet recording method and a dye-sublimation method.

(5) Technical Ideas Derived from Embodiments

[Item 1]

The left side surface 50L of the first chassis 130 is an example of a first side surface. The front surface 50F is an example of a second side surface. The back surface 50B is an example of a third side surface. The right side surface 50R is an example of a fourth side surface. The right side surface 60R of the second chassis 140 is an example of a fifth side surface. The front surface 60F is an example of a sixth side surface. The back surface 60B is an example of a seventh side surface. The left side surface 60L is an example of an eighth side surface. The connector component P1a of the connector Pa is an example of a first connector. The connector component P2a of the connector Pa is an example of a second connector. The connector component P1a of the connector Pb is an example of a third connector. The connector component P2a of the connector Pb is an example of a fourth connector. The markings P1c of the connector Pa represent an example of a first mark (scale). The indicator P2c of the connector Pa represents an example of a first indicator. As described above, according to the invention of Item 1, a pivot axis of the second chassis relative to the first chassis is located substantially in the vicinity of the center of connected surfaces (opposing surfaces) of the first chassis and the second chassis. This allows the second chassis to pivot smoothly relative to the first chassis. Furthermore, a gap between the first chassis and the second chassis can be made small compared to conventional cases. In addition, as the indicator and the mark (scale) are provided, an operator can accurately understand a pivot amount. Therefore, the angle adjustment between the two chassis is facilitated.

[Item 2]

The markings P1c of the connector Pb represent an example of a second mark (scale). The indicator P2c of the connector Pb represents an example of a second indicator. As described above, the mark and the indicator are provided on the third connector and the fourth connector as well; this further facilitates the angle adjustment between the two chassis.

[Item 3]

As shown in FIG. 8A, the oval hole Ha is an example of a fitting hole. In this way, the second connector is expected to be easily installed on the second chassis, even if the height of the second chassis is different from an assumed height due to the inclination of a floor surface.

[Item 4]

As shown in FIG. 8B, the oval hole Hb is an example of a fitting hole. In this way, the fourth connector is expected to be easily installed on the second chassis, even if the height of the second chassis is different from an assumed height due to the inclination of the floor surface.

[Item 5]

As shown in FIG. 7B, the conveyance center line Cp may exist at a position that is substantially at an equal distance from the first connector component P1a of the connector Pa and from the first connector component P1a of the connector Pb. In this way, when looking down the image forming apparatus 100 from above, the pivot center of the second chassis relative to the first chassis is located substantially at the center of the vicinity of the site of connection. This allows the second chassis to pivot easily. Furthermore, the distance d2 between the opposing connected portions can be reduced. As a result, the integrity of the external design of the image forming apparatus 100 is maintained.

[Item 6]

As shown in FIG. 7B, the conveyance center line Cp may exist at a position that is substantially at an equal distance from the second connector component P2a of the connector Pa and from the second connector component P2a of the connector Pb. This allows the second chassis to pivot more easily. Furthermore, the distance d2 between the opposing connected portions can be reduced.

[Item 7]

As shown in FIG. 9A, FIG. 9B, and FIG. 11B, the second connector component P2a may include a guiding hole p2j through which the fastener P2e is inserted and which is parallel to the guiding groove P1d. This is expected to allow the second chassis 140 to move easily in the first direction.

[Item 8]

As shown in FIG. 9C and the like, the embossed portion P1b is an example of a fitting boss. The long hole portion P2b is an example of a guiding hole. This is expected to allow the second chassis 140 to move easily in the first direction.

[Item 9]

As shown in FIG. 9A, FIG. 9B, and FIG. 11B, the connector Pb may also include the above-described fastener and guiding hole.

[Item 10]

As shown in FIG. 11C and the like, the connector Pb may also include the above-described fastener and guiding hole.

[Item 11]

As a plurality of lines are provided as shown in FIG. 11D, the operator is expected to visually understand an amount of adjustment in the first direction with ease.

[Item 12]

As the plurality of lines vary in length as shown in FIG. 11D, the operator is expected to visually understand an amount of adjustment in the first direction with ease.

[Item 13]

As a plurality of lines are provided also on the connector Pb as shown in FIG. 11D, the operator is expected to visually understand an amount of adjustment in the first direction with ease.

[Item 14]

As the plurality of lines provided on the connector Pb vary in length as shown in FIG. 11D, the operator is expected to visually understand an amount of adjustment in the first direction with ease.

[Item 15]

As the first indicator has a triangle shape, the operator is expected to be able to immediately understand the current amount of adjustment.

[Item 16]

As the second indicator has a triangle shape, the operator is expected to be able to immediately understand the current amount of adjustment.

[Item 17]

As shown in FIG. 12D, the recess 19c is an example of a third fitting groove. As shown in FIG. 12B, the pivot shaft 20d is an example of a fitting boss.

This is expected to allow easy connection between the first chassis 130 and the second chassis 140.

[Item 18]

As shown in FIG. 12B, the support table 20c is an example of a support portion. This is expected to allow easy connection between the first chassis 130 and the second chassis 140.

[Item 19]

The distance from the fitting boss to the sixth side surface may be equal to the distance from the fitting boss to the seventh side surface. This is expected to cause the fitting boss, too, to coincide with the pivot center, and allow the second chassis to pivot more easily.

[Item 20]

The first chassis may house an image forming unit. The second chassis may house a fixing unit.

[Item 21]

As shown in FIG. 1, the conveyance belt 118 is an example of a conveyance roller. This is expected to allow a sheet that carries an unfixed toner image thereon to be passed from the first chassis to the second chassis in a stable manner.

[Item 22]

A conveyance guide G is an example of a guiding member. Adopting such an arrangement is expected to allow the sheet to be passed from the first chassis to the second chassis in a more stable manner.

[Item 23]

Adjusting the height of the second chassis is expected to reduce the influence of the inclination of the floor surface.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-167902, filed Oct. 19, 2022 which is hereby incorporated by reference herein in its entirety.

What is claimed is:

1. An image forming apparatus comprising:
a first chassis including a first side surface provided with a passage opening through which a sheet passes, a second side surface that neighbors the first side surface, a third side surface that neighbors the first side surface and is located on an opposite side of the second side surface, and a fourth side surface that neighbors the second side surface and the third side surface;
a second chassis to be connected to the first chassis and including a fifth side surface provided with a passage opening through which the sheet passes, a sixth side surface that neighbors the fifth side surface, a seventh side surface that neighbors the fifth side surface and is located on an opposite side of the sixth side surface, and an eighth side surface that neighbors the sixth side surface and the seventh side surface;
a first connector that is fastened to the second side surface of the first chassis and includes a first guiding groove;
a second connector that overlaps the first connector and includes a first fitting shaft, the first fitting shaft fitting into a fitting hole provided in the sixth side surface of the second chassis and into the first guiding groove, and the first fitting shaft being guided by the first guiding groove so as to move in a first direction;
a third connector that is provided on the third side surface of the first chassis and includes a second guiding groove;
a fourth connector that overlaps the third connector and includes a second fitting shaft, the second fitting shaft fitting into a fitting hole provided in the seventh side surface of the second chassis and into the second guiding groove, and the second fitting shaft being guided by the second guiding groove so as to move in the first direction;
a first scale provided on one of the first connector and the second connector, the first scale indicating a relative distance between the first chassis and the second chassis in the first direction; and
a first indicator provided on the other of the first connector and the second connector, the first indicator pointing the first scale.

2. The image forming apparatus according to claim 1, further comprising:
a second scale provided on one of the third connector and the fourth connector, the second scale indicating a relative distance between the first chassis and the second chassis in the first direction; and
a second indicator provided on the other of the third connector and the fourth connector, the second indicator pointing the second scale.

3. The image forming apparatus according to claim 2, wherein
the second scale includes a plurality of lines along a direction perpendicular to the first direction.

4. The image forming apparatus according to claim 3, wherein
a length of a line arranged at a center among the plurality of lines is longer than a length of a line arranged at an end among the plurality of lines.

5. The image forming apparatus according to claim 2, wherein
the second indicator has a triangle shape.

6. The image forming apparatus according to claim 1, wherein
the fitting hole provided in the sixth side surface of the second chassis is an oval hole that has a small dimension along the first direction, and has a large dimension along a second direction perpendicular to the first direction.

7. The image forming apparatus according to claim 1, wherein
the fitting hole provided in the seventh side surface of the second chassis is an oval hole that has a small dimension along the first direction, and has a large dimension along a second direction perpendicular to the first direction.

8. The image forming apparatus according to claim 1, wherein
a distance from the first connector to a conveyance center line of the sheet is equal to a distance from the third connector to the conveyance center line of the sheet.

9. The image forming apparatus according to claim 1, wherein
a distance from the second connector to a conveyance center line of the sheet is equal to a distance from the fourth connector to the conveyance center line of the sheet.

10. The image forming apparatus according to claim 1, further comprising
a fastener that fastens the second connector to the first connector,
wherein the second connector includes a guiding hole through which the fastener is inserted and which is parallel to the first guiding groove.

11. The image forming apparatus according to claim 1, further comprising:
a fitting boss provided on the first connector; and
a guiding hole which is provided in the second connector, through which the fitting boss is inserted, and which is parallel to the first guiding groove.

12. The image forming apparatus according to claim 1, further comprising
a fastener that fastens the fourth connector to the third connector,
wherein the fourth connector includes a guiding hole through which the fastener is inserted and which is parallel to the second guiding groove.

13. The image forming apparatus according to claim 1, further comprising:
a fitting boss provided on the third connector; and
a guiding hole which is provided in the fourth connector, through which the fitting boss is inserted, and which is parallel to the second guiding groove.

14. The image forming apparatus according to claim 1, wherein
the first scale includes a plurality of lines along a direction perpendicular to the first direction.

15. The image forming apparatus according to claim 14, wherein
a length of a line arranged at a center among the plurality of lines is longer than a length of a line arranged at an end among the plurality of lines.

16. The image forming apparatus according to claim 1, wherein
the first indicator has a triangle shape.

17. The image forming apparatus according to claim 1, wherein
the first chassis includes a first bottom surface and a third fitting groove that has been formed on the first bottom surface and the first side surface, and
the second chassis includes a fitting boss provided on the fifth side surface that opposes the first side surface of the first chassis when connected to the first chassis, the fitting boss fitting into the third fitting groove.

18. The image forming apparatus according to claim 17, wherein
the fitting boss is arranged on a support portion that projects from the fifth side surface toward the first side surface.

19. The image forming apparatus according to claim 17, wherein
a distance from the fitting boss to the sixth side surface is equal to a distance from the fitting boss to the seventh side surface.

20. The image forming apparatus according to claim 1, further comprising:
an image forming unit that is housed in the first chassis and forms a toner image on the sheet; and
a fixing unit that is housed in the second chassis and fixes the toner image on the sheet.

21. The image forming apparatus according to claim 20, further comprising
a conveyance member configured to convey, to the second chassis, the sheet on which the toner image has been formed by the image forming unit,
wherein
a front end of the conveyance member protrudes from the passage opening provided in the first chassis to an outside of the first chassis, and
when the first chassis and the second chassis are connected to each other, the second chassis houses the front end of the conveyance member through the passage opening of the second chassis.

22. The image forming apparatus according to claim 21, wherein
the second chassis further includes a guiding member for guiding the sheet conveyed from the conveyance member, and
the guiding member is placed so that, in a conveyance direction of the sheet, a rear end of the guiding member is lower than the front end of the conveyance member.

23. The image forming apparatus according to claim 1, wherein
the second chassis includes a caster that adjusts a height from a floor on which the second chassis is installed to the second chassis.

* * * * *